US012348811B2

(12) United States Patent
Han et al.

(10) Patent No.: US 12,348,811 B2
(45) Date of Patent: Jul. 1, 2025

(54) ELECTRONIC DEVICE AND CONTROL METHOD THEREOF

(71) Applicant: SAMSUNG ELECTRONICS CO., LTD., Suwon-si (KR)

(72) Inventors: Sangjin Han, Suwon-si (KR); Hyunsoo Yuk, Suwon-si (KR); Heuijin Kwon, Suwon-si (KR); Haein Lee, Suwon-si (KR); Yoojin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/205,833

(22) Filed: Jun. 5, 2023

(65) Prior Publication Data

US 2023/0319339 A1    Oct. 5, 2023

Related U.S. Application Data

(63) Continuation of application No. PCT/KR2020/019303, filed on Dec. 29, 2020.

(30) Foreign Application Priority Data

Dec. 18, 2020    (KR) .................. 10-2020-0178218

(51) Int. Cl.
   *H04N 21/422*    (2011.01)
   *H04N 21/436*    (2011.01)
   *H04N 21/485*    (2011.01)

(52) U.S. Cl.
   CPC ....... *H04N 21/4222* (2013.01); *H04N 21/436* (2013.01); *H04N 21/4852* (2013.01); *H04N 21/4858* (2013.01)

(58) Field of Classification Search
   CPC ............. H04N 21/4222; H04N 21/436; H04N 21/4852; H04N 21/4858; H04N 21/422;
   (Continued)

(56) References Cited

U.S. PATENT DOCUMENTS 8,519,964 B2 *   8/2013   Platzer .................. G06F 1/1656
                                                              345/173
8,670,709 B2    3/2014   Griffin et al.
                 (Continued)

FOREIGN PATENT DOCUMENTS

JP        2014-153782 A      8/2014
KR    10-2008-0107236 A     12/2008
                 (Continued)

OTHER PUBLICATIONS

Search Report (PCT/ISA/210) issued Sep. 6, 2021 by the International Searching Authority for International Patent Application No. PCT/KR2020/019303.

(Continued)

*Primary Examiner* — An Son P Huynh
(74) *Attorney, Agent, or Firm* — Sughrue Mion, PLLC

(57) ABSTRACT

An electronic device includes a sensor, an interface, and at least one processor. According to a method of controlling the device, the at least one processor is configured to perform an initial function corresponding to a proximity event, responsive to detecting the proximity event through the sensor; identify an external device corresponding to the detected proximity event through the interface; identify a type of a subsequent event caused by the identified external device, responsive to detecting the subsequent event while performing the initial function; and perform a supplementary function related to a content corresponding to the identified type of the subsequent event among a plurality of supplementary functions related to the content providable corresponding to the initial function.

19 Claims, 20 Drawing Sheets

(58) Field of Classification Search
CPC ......... H04N 21/4363; H04N 21/43637; H04N 21/42212; H04N 21/43615; G06F 3/0484; G06F 3/04845

See application file for complete search history.

(56) References Cited

U.S. PATENT DOCUMENTS

| | | | | |
|---|---|---|---|---|
| 8,930,975 | B2* | 1/2015 | Woods | H04N 21/435 725/12 |
| 9,191,689 | B2* | 11/2015 | Fife | H04N 21/6543 |
| 9,285,989 | B2* | 3/2016 | Park | G06F 3/0488 |
| 9,329,851 | B2* | 5/2016 | Lalmalani | G06F 3/04812 |
| 9,621,953 | B1* | 4/2017 | Holcomb | H04N 21/8456 |
| 10,088,983 | B1* | 10/2018 | Qaddoura | H04N 21/23439 |
| 10,205,988 | B1* | 2/2019 | Waterman | H04N 21/8455 |
| 2008/0303682 | A1 | 12/2008 | Han | |
| 2009/0051761 | A1* | 2/2009 | Atarashi | H04N 21/4325 348/54 |
| 2010/0023858 | A1* | 1/2010 | Ryu | G06F 3/0482 715/702 |
| 2010/0082784 | A1 | 4/2010 | Rosenblatt et al. | |
| 2011/0069940 | A1* | 3/2011 | Shimy | H04N 21/4532 386/296 |
| 2011/0138334 | A1* | 6/2011 | Jung | H04N 21/482 345/156 |
| 2011/0164175 | A1* | 7/2011 | Chung | H04N 21/42209 348/468 |
| 2011/0252446 | A1* | 10/2011 | Jeong | H04N 21/482 725/38 |
| 2012/0096393 | A1* | 4/2012 | Shim | G06F 3/04883 715/784 |
| 2012/0206391 | A1 | 8/2012 | Kim et al. | |
| 2013/0027613 | A1* | 1/2013 | Kim | H04N 21/4316 348/563 |
| 2013/0169546 | A1* | 7/2013 | Thomas | G06F 3/04883 345/173 |
| 2013/0173765 | A1* | 7/2013 | Korbecki | H04N 21/42209 709/221 |
| 2014/0051354 | A1 | 2/2014 | Lee | |
| 2014/0068692 | A1* | 3/2014 | Archibong | H04N 21/6334 725/116 |
| 2014/0223359 | A1 | 8/2014 | Yamada | |
| 2014/0292760 | A1* | 10/2014 | Shikolay | G06F 3/0488 345/428 |
| 2014/0298252 | A1 | 10/2014 | Choi et al. | |
| 2015/0128158 | A1* | 5/2015 | Wheatley | H04N 21/44218 725/12 |
| 2015/0178511 | A1* | 6/2015 | Klappert | G06F 21/6245 726/27 |
| 2016/0048285 | A1* | 2/2016 | Jwa | G06F 3/0486 715/769 |
| 2016/0070466 | A1* | 3/2016 | Chaudhri | G06F 3/04883 715/765 |
| 2016/0162058 | A1* | 6/2016 | You | G06F 3/03547 345/157 |
| 2017/0017355 | A1* | 1/2017 | Lim | G06F 3/0484 |
| 2017/0264920 | A1* | 9/2017 | Mickelsen | G06V 20/52 |
| 2017/0351397 | A1* | 12/2017 | Won | G06F 3/046 |
| 2018/0081538 | A1* | 3/2018 | Kim | G06F 3/04883 |
| 2018/0130429 | A1* | 5/2018 | Son | G09G 3/3413 |
| 2018/0335922 | A1* | 11/2018 | Nilo | G06F 3/04845 |
| 2019/0250757 | A1 | 8/2019 | Han et al. | |
| 2019/0377932 | A1* | 12/2019 | Alameh | H04N 21/4661 |
| 2020/0120384 | A1* | 4/2020 | Armaly | H04N 21/4396 |
| 2020/0178056 | A1 | 6/2020 | Fu et al. | |
| 2021/0208671 | A1 | 7/2021 | Jin et al. | |
| 2022/0103873 | A1* | 3/2022 | Yoshida | H04N 21/47217 |
| 2023/0199262 | A1* | 6/2023 | Fang | G06F 3/048 725/37 |
| 2023/0221769 | A1* | 7/2023 | Koh | G06F 1/1677 361/679.26 |

FOREIGN PATENT DOCUMENTS

| | | |
|---|---|---|
| KR | 10-2010-0031748 A | 3/2010 |
| KR | 10-2012-0093746 A | 8/2012 |
| KR | 10-2014-0024543 A | 3/2014 |
| KR | 10-2014-0120211 A | 10/2014 |
| KR | 10-2015-0012945 A | 2/2015 |
| KR | 10-2016-0019709 A | 2/2016 |
| KR | 10-2017-0033699 A | 3/2017 |
| KR | 10-2019-0097973 A | 8/2019 |
| KR | 10-2021-0087332 A | 7/2021 |
| WO | 2009/009106 A1 | 1/2009 |

OTHER PUBLICATIONS

Written Opinion (PCT/ISA/237) issued Sep. 6, 2021 by the International Searching Authority for International Patent Application No. PCT/KR2020/019303.

* cited by examiner

FIG. 11
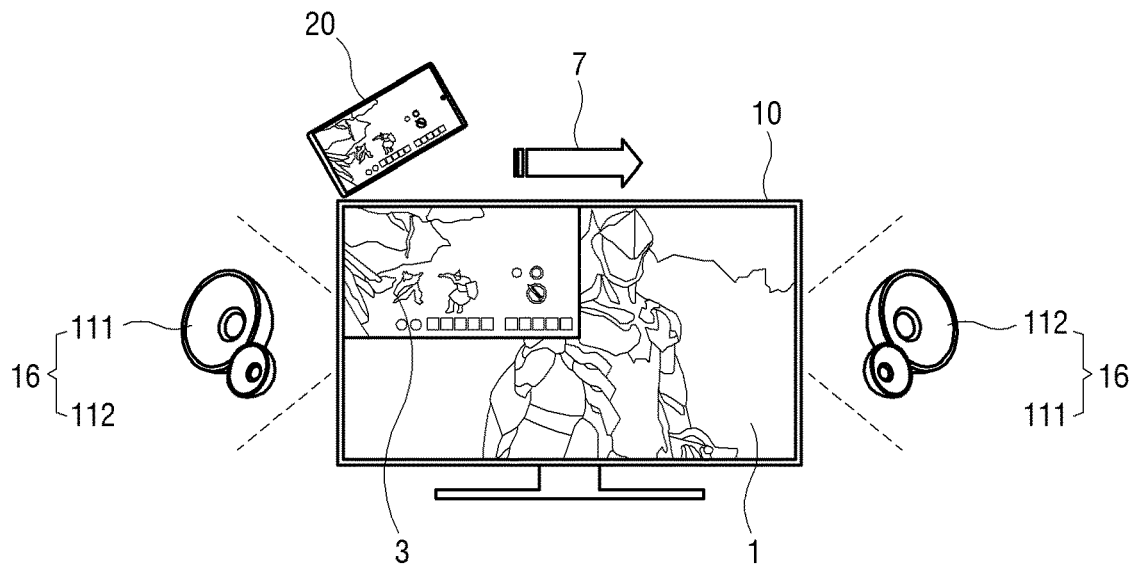
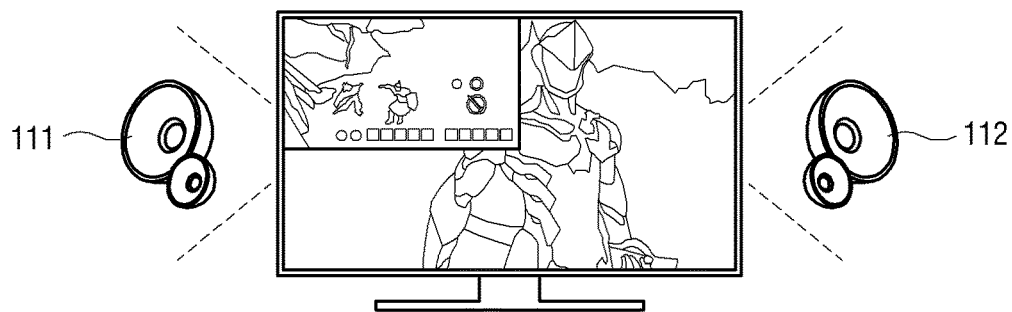

FIG. 12
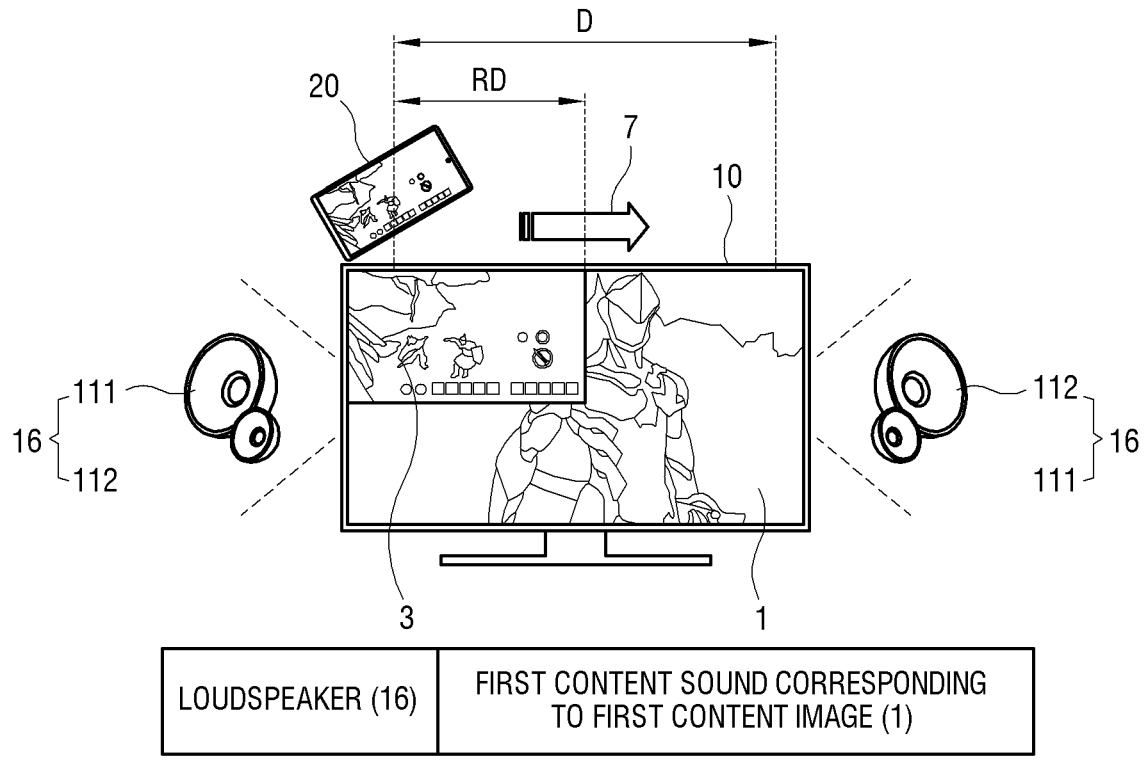
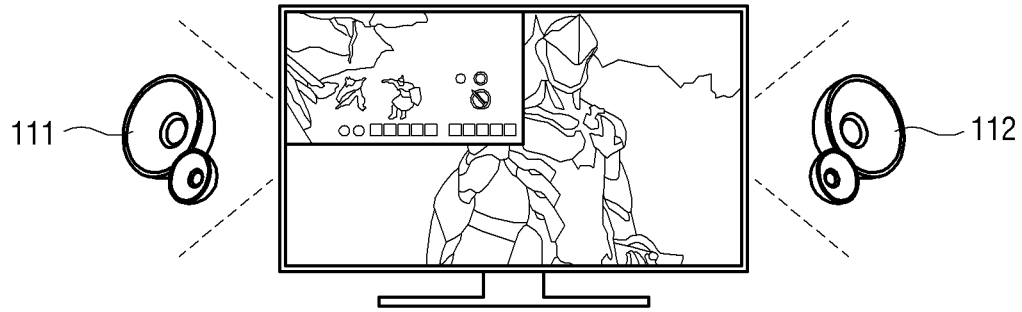

FIG. 17

| TYPES OF SUBSEQUENT EVENTS | | FUNCTIONS RELATED TO CONTENT |
|---|---|---|
| DRAGGING | DISTANCE | SIZE ADJUSTMENT OF SECOND EXTERNAL CONTENT IMAGE (3) |
| | DIRECTION | POSITION MOVEMENT OF SECOND EXTERNAL CONTENT IMAGE (3) |
| | SPEED | TRANSMISSION OF SECOND EXTERNAL CONTENT IMAGE (3) TO OUTSIDE |
| | DIRECTION AND SPEED | IMAGE SWITCHING |
| TOUCHING | ONCE | ⋮ |

PLEASE SET FUNCTIONS CORRESPONDING TO TYPES OF SUBSEQUENT EVENTS

ELECTRONIC DEVICE AND CONTROL METHOD THEREOF

CROSS-REFERENCE TO RELATED APPLICATIONS

This application is a bypass continuation application of International Patent Application No. PCT/KR2020/019303, filed on Dec. 29, 2020, which is based on and claims priority to Korean Patent Application No. 10-2020-0178218, filed on Dec. 18, 2020 with the Korean Intellectual Property Office, the disclosures of each of which are incorporated by reference herein in their entireties.

BACKGROUND

1. Field

The disclosure relates to an electronic device and a control method thereof, and more particularly to an electronic device capable of providing a near field control function based on a proximity event and a subsequent event, and a control method thereof.

2. Description of Related Art

Recently, a near field control between devices has been widely used. For example, a TV having a near field communication (NFC) function may perform mirroring to display a content image by receiving data of the content image displayed on a smartphone having the same function based on only a proximity event of the smartphone. The near field control improves convenience and quickness because a function desired by a user is rapidly provided by only a simple proximity event.

The proximity event refers to a kind of event based on a user's gesture of touching the smartphone to a certain side of the TV or a certain area of the certain side. However, in the related art, the type of proximity event is limited to the structural characteristics of the TV. Therefore, the functions provided by the near field control are restricted even though the TV provides various functions. For example, in the case of a touch type proximity event, the proximity event is limited in the related art to touches corresponding to the upper, lower, left and right sides of the TV, and only functions corresponding to the touches on the upper, lower, left and right sides are provided, thereby deteriorating the utilization of the near field control.

Accordingly, there is a need for a method of improving the utilization of the near field control by securing the diversity of the event for the near field control so that various functions of the TV can be provided through the event for the near field control.

SUMMARY

An aspect of the disclosure is to provide an electronic device and a control method thereof, in which the diversity of an event for near field control is secured, so that various functions of the electronic device can be provided through the event for the near field control, thereby improving the utilization of the near field control.

According to an embodiment of the disclosure, an electronic device includes: a sensor; an interface; and at least one processor configured to: perform an initial function corresponding to a proximity event, responsive to detecting the proximity event through the sensor; identify an external device corresponding to the detected proximity event through the interface; identify a type of a subsequent event caused by the identified external device, responsive to detecting the subsequent event while performing the initial function; and perform a supplementary function related to a content corresponding to the identified type of the subsequent event among a plurality of supplementary functions related to the content providable corresponding to the initial function.

The at least one processor may identify the type of the subsequent event as one of dragging or touching, based on a sensor value corresponding to the subsequent event obtained through the sensor.

At least one supplementary function of the plurality of supplementary functions may correspond to at least one of a distance, a direction, or a speed of the dragging.

At least one supplementary function of the plurality of supplementary functions may be an adjustment of a display size of a content image, which is being displayed on a display according to performance of the initial function, based on the identified dragging.

At least one supplementary function of the plurality of supplementary functions may be a movement of a display position of a content image, which is being displayed on a display according to performance of the initial function, based on the identified dragging.

At least one supplementary function of the plurality of supplementary functions may be a movement of a content image, which is being displayed on a display at a first display position according to performance of the initial function, to a second display position when the distance of the identified dragging exceeds a predetermined threshold.

At least one supplementary function of the plurality of supplementary functions may be a control of the interface to transmit content data to an external output device corresponding to the direction of the identified dragging.

At least one supplementary function of the plurality of supplementary functions may be an adjustment of a volume of a content sound, which is being output through a loudspeaker according to performance of the initial function, based on the identified dragging.

At least one supplementary function of the plurality of supplementary functions may be a control of a content sound, which is being output through one loudspeaker of a plurality of loudspeakers according to performance of the initial function, to be output through another loudspeaker of the plurality of loudspeakers corresponding to the direction of the identified dragging.

At least one supplementary function of the plurality of supplementary functions may be a control of a second content sound to be output through a loudspeaker, in place of first content sound which is being output through the loudspeaker according to performance of the initial function, upon the distance of the identified dragging exceeding a predetermined threshold.

When the type of the subsequent event is touching, the at least one processor may identify content to be output among a plurality of pieces of content based on a number of occurrences of the touching.

The at least one processor may be configured to receive information about a direction of the touching from the external device, and at least one supplementary function of the plurality of supplementary functions corresponds to the direction of the touching.

The at least one processor may be configured to output a plurality of pieces of content respectively corresponding to a plurality of external devices, based on the proximity event being caused by the plurality of external devices.

According to an embodiment of the disclosure, a method of controlling an electronic device includes: performing an initial function corresponding to a proximity event, responsive to detecting the proximity event; identifying an external device corresponding to the detected proximity event; identifying a type of a subsequent event caused by the identified external device, responsive to detecting the subsequent event while performing the initial function; and performing a supplementary function related to a content corresponding to the identified type of the subsequent event among a plurality of supplementary functions related to the content providable corresponding to the initial function.

According to an embodiment of the disclosure, a non-transitory recording medium stores a computer program comprising computer readable code for controlling an electrode device, by operations including: performing an initial function corresponding to a proximity event, responsive to detecting the proximity event; identifying an external device corresponding to the detected proximity event; identifying a type of a subsequent event caused by the identified external device, responsive to detecting the subsequent event while performing the initial function; and performing a supplementary function related to a content corresponding to the identified type of the subsequent event among a plurality of supplementary functions related to the content providable corresponding to the initial function.

According to various embodiments of the disclosure, there are provided an electronic device and a control method thereof, in which the diversity of an event for near field control is secured, so that various functions of the electronic device can be provided through the event for the near field control, thereby improving the utilization of the near field control.

BRIEF DESCRIPTION OF THE DRAWINGS

The above and other aspects and features of certain embodiments of the present disclosure will be more apparent from the following description taken in conjunction with the accompanying drawings, in which:

FIG. 11 illustrates a specific example supplementary function of selecting a loudspeaker to output a content sound according to the types of subsequent event, according to an embodiment of the disclosure;

FIG. 12 illustrates a specific example supplementary function of switching and outputting a content sound according to the types of subsequent event, according to an embodiment of the disclosure;

FIG. 17 illustrates a specific example of setting a supplementary function to be performed corresponding to a subsequent event, according to an embodiment of the disclosure;

DETAILED DESCRIPTION

Figure 1:
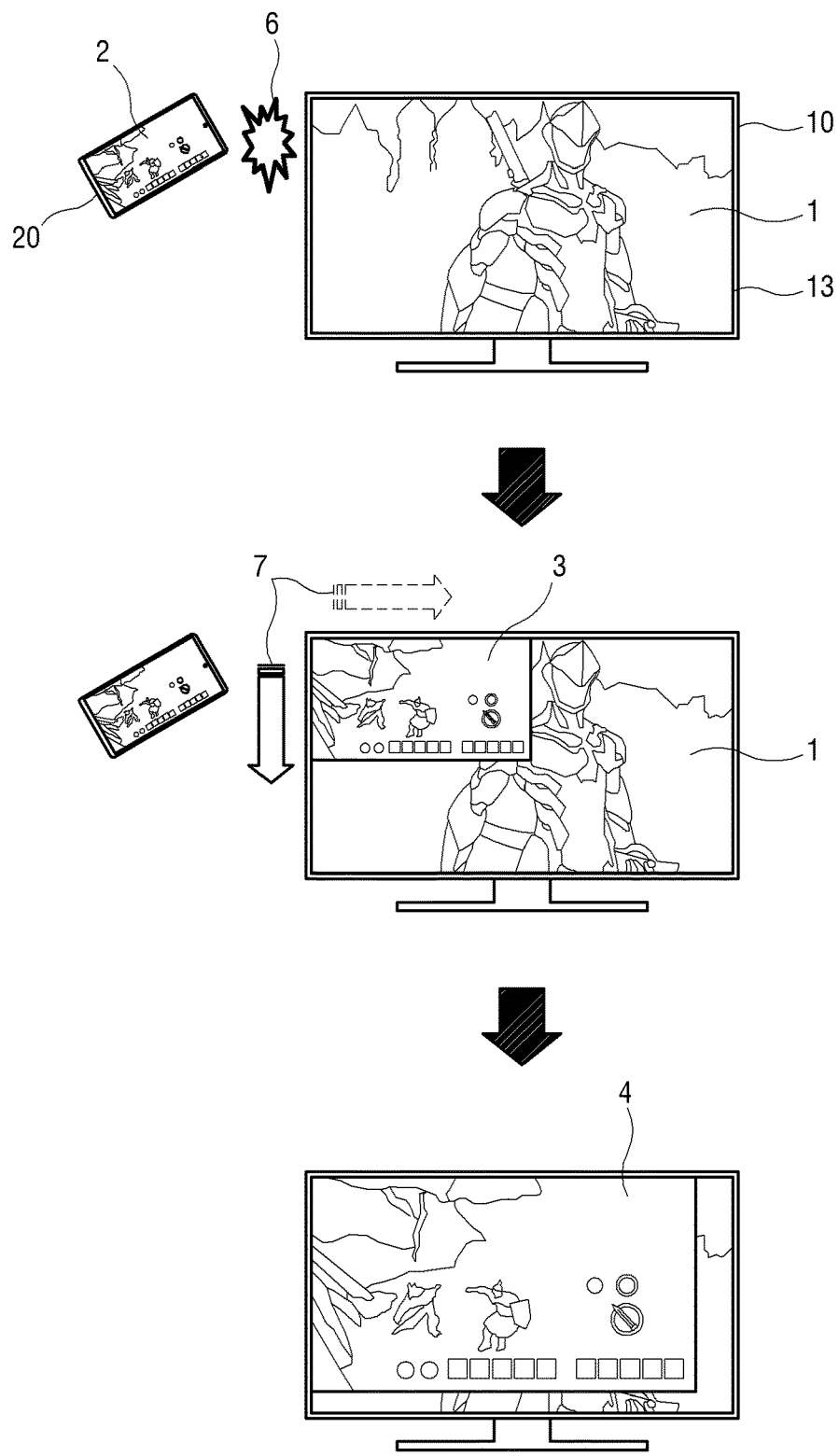
FIG. 1 illustrates an electronic device according to an embodiment of the disclosure.

Below, embodiments of the disclosure will be described in detail with reference to accompanying drawings. In the description of the following embodiments, elements illustrated in the accompanying drawings will be referenced, and like numerals or symbols set forth in the drawings refer to like elements having substantially the same operations. In the disclosure, at least one among a plurality of elements refers to not only all the plurality of elements but also both each one of the plurality of elements excluding the other elements and a combination thereof.

FIG. 1 illustrates an electronic device according to an embodiment of the disclosure.

As shown in FIG. 1, an electronic device 10 is implemented by various types of apparatuses, such as a set-top box having no display, and the like image processing apparatuses; a refrigerator, a washing machine, and the like home appliances; a computer and the like information processing apparatuses; as well as a TV, a tablet PC, a portable media player, a wearable device, a video wall, an electronic picture frame, and the like image display apparatuses. Further, the electronic device 10 is implemented by an artificial intelligence (AI) loudspeaker with an AI function, an AI robot, etc. However, for convenience of description, it will be assumed that the TV is implemented as the electronic device 10, but there are no limits to the type of the electronic device 10.

The electronic device 10 supports the near field control. The near field control refers to a technology that controls any one function through communication between the electronic device 10 and an external device 20 in a near field. The near field control is based on various near field control protocols such as near field communication (NFC), Bluetooth, Bluetooth low energy (LE), etc. For convenience of description, it will be described that the electronic device 10 and the external device 20 have an NFC function and the near field control is performed based on NFC protocols. For example, the near field control for the function of the electronic device 10 is performed by a proximity event 6 using the external device 20.

The electronic device 10 detects the proximity event 6 caused by the external device 20. The proximity event 6 is a kind of user gesture using the external device 20. For example, when the electronic device 10 has top, bottom, left and right sides, the proximity event 6 includes a gesture of touching the external device 20 to a certain side or a certain area of the certain side.

The electronic device 10 may use a sensor value of a first sensor 15 (see FIG. 2) to detect the proximity event 6. The detection of the proximity event 6 will be described in detail with reference to FIG. 4.

The electronic device 10 performs a function corresponding to the proximity event 6, which may be termed an initial function. The function corresponding to the proximity event 6 includes at least one of various functions providable by the electronic device 10. The functions providable by the electronic device 10 includes basic functions of the electronic device 10, such as power on/off, channel switching, volume control, display/change/termination of content, execution/termination of a specific application, and display/selection/termination of a setting menu. For example, when the electronic device 10 is in a power off state, the electronic device 10 may be powered on in response to the proximity event 6.

Alternatively, the function corresponding to the proximity event 6 includes a content sharing function such as mirroring, Digital Living Network Alliance (DLNA), and casting. The electronic device 10 outputs content based on content data received from the external device 20 through the mirroring or the DLNA, and outputs content by receiving data of content designated by the external device 20 through the casting. The content includes at least one of an image or a sound.

To describe an example where the mirroring is performed corresponding to the proximity event 6, it will be assumed that a first content image 1 is displayed on a first display 13 of the electronic device 10 and a first external content image 2 is displayed on the external device 20. When the proximity event 6 caused by the external device 20 is detected, the electronic device 10 performs connecting with the external device 20 through an interface 11 (see FIG. 2) and receives data of the first external content image 2. The electronic device 10 may use the NFC protocol to perform connecting with the external device 20 and receiving the data of the first external content image 2. The electronic device 10 may display a second external content image 3 corresponding to the first external content image 2 on a display 13 based on the received data.

The displaying type and position of the second external content image 3 may be based on a position where the proximity event 6 is detected. For example, when the proximity event 6 is detected at an upper left portion of the electronic device 10, the displaying type of the second external content image 3 may be picture-in-picture (PIP) where the second external content image 3 is displayed overlapping the first content image 1. In this case, the second external content image 3 may be displayed in the upper left portion of the first display 13.

Alternatively, when the proximity event 6 is detected at an upper side of the electronic device 10, the displaying type of the second external content image 3 may be picture-by-picture (PBP) where the second external content image 3 is displayed in parallel with the first content image 1. In this case, the second external content image 3 may be displayed in an upper portion of the first display 13. However, the displaying type and position of the second external content image 3 corresponding to the detection position of the proximity event 6 may be variously designed.

The electronic device 10 identifies the external device 20 causing the proximity event 6. The electronic device 10 may identify the external device 20 based on data transmitted to and received from the external device 20 through the NFC protocol. For example, the electronic device 10 stores first identification information about the external device 20, and receives second identification information from the external device 20 connected through the NFC protocol in response to the proximity event 6 of the external device 20. The electronic device 10 may identify the external device 20 causing the proximity event 6 through comparison between the first identification information and the second identification information. However, the electronic device 10 may be designed to identify the external device 20 by various methods without limitations.

When a subsequent event 7 caused by the external device 20 is detected while performing a function corresponding to the proximity event 6, the electronic device 10 identifies the type of the subsequent event 7. The type of the subsequent event 7 may be either of dragging and touching, although types are not limited thereto. For example, when the movement of the external device 20 is detected while the second external content image 3 is displayed by the PIP in response to the proximity event 6 of the external device 20, the electronic device 10 may identify the type of the subsequent event 7 as the dragging. The movement of the external device 20 may include movement in various directions, such as downward movement from the upper left side of the electronic device 10, and rightward movement from the upper side. The process of identifying the type of the subsequent event 7 will be described with reference to FIG. 4.

The electronic device 10 performs an initial function corresponding to the proximity event 6, and a function corresponding to the type of the subsequent event 7 (which may be termed a supplementary function) among a plurality of supplementary functions related to content providable corresponding to the type of the subsequent event 7. As described above, the function corresponding to the proximity event 6 includes the basic functions such as power on/off, and the content sharing function such as mirroring. For example, when the electronic device 10 is being powered on corresponding to the proximity event 6, the electronic device 10 may be powered off corresponding to the subsequent event 7, e.g., the touching. Alternatively, when the second external content image 3 is displayed by the PIP as shown in FIG. 1, the electronic device 10 may be powered off corresponding to the subsequent event 7, i.e., the touching.

Meanwhile, the plurality of functions related to content, providable corresponding to the types of the subsequent event 7, includes the size adjustment, movement, switch, etc. of the second external content image 3 displayed corresponding to the proximity event 6. For example, as shown in FIG. 1, when the second external content image 3 is displayed in the upper left portion of the first display 13 by the PIP based on the proximity event 6 of the external device 20, the electronic device 10 adjusts the height of the second external content image 3 corresponding to downward dragging from the left side, and displays a third external content image 4 corresponding to the height adjustment. As the height is adjusted, the width may also be adjusted. Thus, the electronic device 10 may display the third external content image 4 based on the adjustment in height and width corresponding to the downward dragging on the left side. Alternatively, the electronic device 10 may display the third external content image 4 based on adjustment in at least one of the height or the width corresponding to rightward dragging on the upper side. What function to be performed according to the types of the subsequent event 7 may be variously designed.

In the foregoing description, the proximity event 6 and the subsequent event 7 are regarded as separate events, and the function corresponding to the proximity event 6 and the function corresponding to the type of the subsequent event 7 are separately performed. However, the electronic device 10 may regard the proximity event 6 and the subsequent event 7 as a single event and perform a corresponding function. For example, the electronic device 10 does not display the second external content image 3 even when the proximity event 6 is detected in the upper left portion of the electronic device 10, but displays the second external content image 3 when the subsequent event 7 such as the downward dragging on the left side is detected, or adjusts the height of the second external content image 3 while displaying the second external content image 3. Whether to regard the proximity event 6 and the subsequent event 7 as a single event, the function corresponding to the single event, etc. may be variously designed. However, for convenience of description, it will be described that the proximity event 6 and the subsequent event 7 are regarded as separate events and the functions corresponding to the separate events are performed.

In this way, the electronic device 10 performs various initial and supplementary functions providable by the electronic device 10 according to the proximity event 6 and the types of the subsequent event 7, thereby improving the utilization of near field control as compared with a case of using only the proximity event 6.

Figure 2:
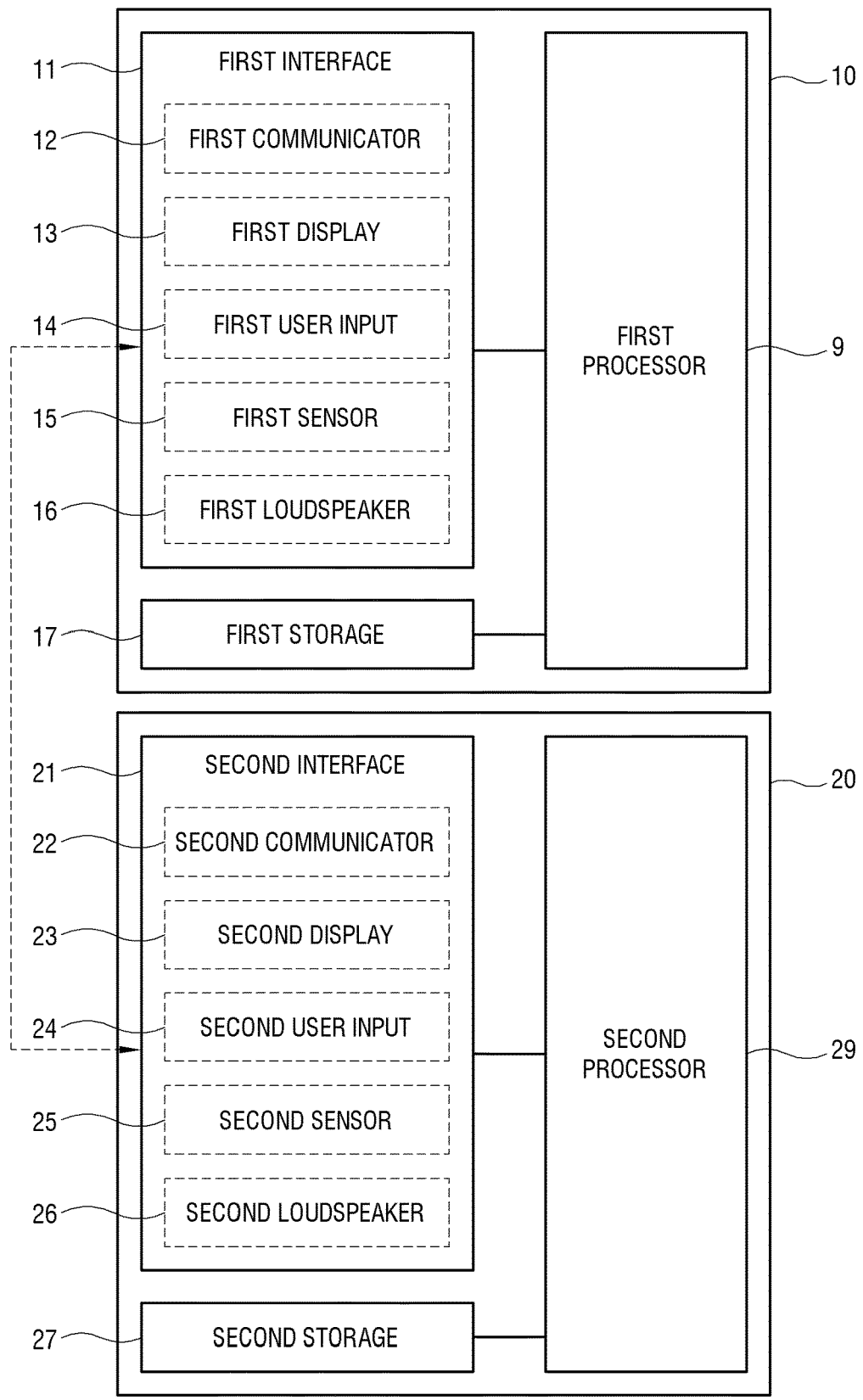
FIG. 2 is a block diagram of an electronic device and an external device, according to an embodiment of the disclosure.

FIG. 2 illustrates a configuration of the electronic device of FIG. 1, according to an embodiment of the disclosure.

Below, the configuration of the electronic device 10 will be described with reference to FIG. 2. In this embodiment, it will be described that the electronic device 10 is a TV. However, the electronic device 10 may be implemented by various kinds of apparatuses, and this embodiment does not limit the configuration of the electronic device 10. The electronic device 10 need not be implemented by a TV or the like display apparatus, and the electronic device 10 in this case need not include the first display 13 and the like elements for displaying an image. For example, when the electronic device 10 is implemented by the set-top box, the electronic device 10 outputs an image signal to an external TV through a first interface 11.

The electronic device 10 includes the first interface 11. The first interface 11 is connected to an external device 20 and transmits and receives data to and from the external device 20 through a network. However, the first interface 11 may be connected to various apparatuses through a network, without limitations.

The first interface 11 includes a wired interface. The wired interface includes a connector or port to which an antenna for receiving a broadcast signal based on terrestrial/satellite broadcasting standards and the like broadcasting standards is connected, or to which a cable for receiving a broadcast signal based on cable broadcasting standards is connected. Alternatively, the electronic device 10 may include a built-in antenna for receiving a broadcast signal. The wired interface includes a connector, a port, etc. based on video and/or audio transmission standards, such as High-Definition Multimedia Interface (HDMI), DisplayPort, Digital Visual Interface (DVI), Thunderbolt, composite video, component video, super video, or Syndicat des Constructeurs d'Appareils Radiorécepteurs et Téléviseurs (SCART). The wired interface includes a connector, a port, etc. based on universal data transmission standards, such as a universal serial bus (USB) port, etc. The wired interface includes a connector, a port, etc. to which an optical cable based on optical transmission standards is connectable.

The wired interface includes a connector, a port, etc. to which an internal microphone or an external audio device with a microphone is connected, and which receives or inputs an audio signal from the audio device. The wired interface includes a connector, a port, etc. to which a headset, an earphone, an external loudspeaker or the like audio device is connected, and which transmits or outputs an audio signal to the audio device. The wired interface includes a connector or a port based on Ethernet or the like network transmission standards. For example, the wired interface is implemented by a local area network (LAN) card or the like connected to a router or a gateway by a wire.

The wired interface is connected to a set-top box, an optical media player or the like external apparatus or an external display apparatus, a loudspeaker, a server, etc. by a cable in a manner of one-to-one or one-to-N (where, N is a natural number) through the connector or the port, thereby receiving a video/audio signal from the corresponding external apparatus or transmitting a video/audio signal to the corresponding external apparatus. The wired interface may include connectors or ports to individually transmit video/audio signals.

The wired interface may be built-in the electronic device 10, but may also be implemented in the form of a dongle or a module and detachably connected to the connector of the electronic device 10.

The first interface 11 includes a wireless interface. The wireless interface is variously implemented corresponding to the type of the electronic device 10. For example, the wireless interface uses wireless communication based on near field communication (NFC), Bluetooth, Bluetooth low energy (LE), radio frequency (RF), Zigbee, Wi-Fi, ultra wideband (UWB), etc. The wireless interface may be implemented by a wireless communication module that performs wireless communication with an access point (AP) based on Wi-Fi, a wireless communication module that performs one-to-one direct wireless communication such as Bluetooth, etc. The wireless interface wirelessly communicates with the external device 20, an external output device 100 (see FIG. 9), an external server, etc. on the network, thereby transmitting and receiving a data packet to and from them.

The wireless interface includes an infrared (IR) transmitter and/or an IR receiver to transmit and/or receive an IR signal based on IR communication standards. The wireless interface receives or inputs a remote-control signal from a remote controller of the electronic device 10 or other external devices, or transmits or outputs the remote-control signal to the remote controller of the electronic device 10 or other external devices through the IR transmitter and/or IR receiver. Alternatively, the electronic device 10 may transmit and receive the remote-control signal to and from the remote controller of the electronic device 10 or other external devices through the wireless interface based on Wi-Fi, Bluetooth or the like other standards.

The electronic device 10 may further include a tuner to be tuned to channels for a broadcast signal, when the broadcast signal is a video/audio signal received through the first interface 11.

The electronic device 10 includes a first communicator 12. The first communicator 12 includes a communication circuit, and connects with the external device 20, thereby transmitting a video/audio signal. The first communicator 12 may be designed to include at least one of the wired interface or the wireless interface, and performs the function of at least one of the wired interface or the wireless interface.

The electronic device 10 includes the first display 13. The first display 13 includes a display panel capable of displaying an image on a screen thereof. The display panel may have a light receiving structure like a liquid crystal display (LCD) type, or a self-emissive structure like an organic light emitting diode (OLED) type. The first display 13 may include an additional element according to the structures of the display panel. For example, when the display panel is of the LCD type, the first display 13 includes an LCD panel, a backlight unit for illuminating the LCD panel, and a panel driving substrate for driving liquid crystal of the LCD panel. However, the first display 13 may be excluded when the electronic device 10 is implemented by a set-top box or the like.

The electronic device 10 includes a first user input 14. The first user input 14 includes circuitries related to various kinds of input interfaces provided to be manipulated by a user to allow a user to make an input. The first user input 14 may be variously configured according to the types of the electronic device 10. For example, the first user input 14 includes mechanical or electronic buttons, a touch pad, a touch screen provided in the first display 13 of the electronic device 10.

The electronic device 10 includes a first sensor 15. The first sensor 15 obtains sensor values for detecting a position where the proximity event 6 caused by the external device 20 occurs, the types of subsequent event 7, etc. The first sensor 15 may be provided in a bezel surrounding the first display 13, and obtain the sensor value for detecting contact or contactless proximity of the external device 20 with respect to the bezel. The first sensor 15 may include an infrared sensor, a proximity sensor, a distance sensor, a direction sensor, a gyro sensor, etc., and a plurality of first sensors 15 may be provided. The infrared sensor may obtain the sensor value for detecting the position and the like of the proximity event 6 by measuring time taken for an infrared signal to be reflected back after being output.

The electronic device 10 includes a first loudspeaker 16. The first loudspeaker 16 outputs various sounds based on an audio signal. The first loudspeaker 16 may include at least one loudspeaker. The first loudspeaker 16 may be implemented by an internal loudspeaker provided in the electronic device 10 or an external loudspeaker provided in the outside. When the loudspeaker 16 is implemented by the external loudspeaker, the electronic device 10 transmits an audio signal to the external loudspeaker through a cable or wirelessly.

The electronic device 10 includes a microphone. The microphone receives various audio signals. The microphone transmits a collected audio signal to a first processor 9. The microphone may be implemented by an internal microphone provided in the electronic device 10 or an external microphone provided in the remote controller of the electronic device 10 separated from the main body. When the microphone is implemented by the external microphone, the audio signal received in the external microphone is digitized and then transmitted from the remote controller of the electronic device 10 to the first interface 11.

The first display 13, the first user input 14, the first sensor 15, the first loudspeaker 16, etc. are described as elements that are separate from the first interface 11, but may be designed to be included in the first interface 11.

The electronic device 10 includes a first storage 17. The first storage 17 is configured to store digitized data. The first storage 17 includes a nonvolatile storage in which data is retained regardless of whether power is on or off. The storage includes a flash memory, a hard-disc drive (HDD), a solid-state drive (SSD), a read only memory (ROM), etc.

The first storage 17 is loaded with data or the like to be processed by the first processor 9, and includes a volatile memory in which data is retained only when power is on. The memory includes a buffer, a random-access memory, etc.

The electronic device 10 includes the first processor 9. The first processor 9 includes one or more hardware processors implemented as a central processing unit (CPU), a chipset, a buffer, a circuit, etc. which are mounted onto a printed circuit board (PCB), and may be designed as a system on chip (SoC). When the electronic device 10 is implemented as a display apparatus, the first processor 9 includes modules corresponding to various processes, such as a demultiplexer, a decoder, a scaler, an audio digital signal processor (DSP), an amplifier, etc. Here, some or all of such modules are implemented as an SOC. For example, the demultiplexer, the decoder, the scaler and the like video processing modules may be implemented as a video processing SOC, and the audio DSP may be implemented as a chipset separated from the SOC.

The first processor 9 performs a function corresponding to the proximity event 6 when the proximity event 6 is detected by the first sensor 15, and identifies the external device 20 corresponding to the proximity event 6.

The first processor 9 identifies the type of the subsequent event 7 when the subsequent event 7 caused by the external device 20 is detected while the function is performed corresponding to the proximity event 6, and performs the function corresponding to the proximity event 6 and the function related to content corresponding to the identified type of the subsequent event 7 among the plurality of functions related to content providable corresponding to the type of the subsequent event 7.

However, the configuration of the electronic device 10 is not limited to that shown in FIG. 2, but may be designed to exclude some elements from the foregoing configuration or include other elements in addition to the foregoing configuration.

Below, the configuration of the external device 20 will be described in detail with reference to FIG. 2. The external device 20 may be implemented by a smartphone or the like, and may include the same or similar configuration to the electronic device 10. Therefore, for convenience of description, repetitive descriptions to the electronic device 10 will be avoided, and different parts will be mainly described below.

The external device 20 includes a second interface 21. The electronic device 10 and the external device 20 are connected through the first interface 11 and the second interface 21, thereby transmitting and receiving the data. The second interface 21 includes a wired interface and a wireless interface.

The external device 20 includes a second communicator 22. The second communicator 22 is connected to the electronic device 10 or other external devices through the network, thereby transmitting the data. The second communicator 22 may be designed to include at least one of the wired interface or the wireless interface, and perform at least one function of the wired interface or the wireless interface.

The external device 20 includes a second display 23. The second display 23 includes a display panel for displaying an image on a screen thereof.

The external device 20 includes a second user input 24. The second user input 24 includes circuitries related to various kinds of input interfaces provided to be manipulated by a user to allow a user to make an input.

The external device 20 includes a second sensor 25. The second sensor 25 obtains the sensor value for detecting the position where the proximity event 6 occurs with respect to the electronic device 10, the type of the subsequent event 7, etc. The second sensor 25 may include an infrared sensor, a proximity sensor, a distance sensor, a direction sensor, a gyro sensor, etc., and a plurality of second sensors 25 may be provided.

The external device 20 includes an second loudspeaker 26. The second loudspeaker 26 outputs various sounds based on an audio signal. The second loudspeaker 26 is implemented by at least one loudspeaker.

The external device 20 includes a second storage 27. The second storage 27 is configured to store digitized data. The second storage 27 includes nonvolatile and volatile storages.

The external device 20 includes the second processor 29. The second processor 29 includes one or more hardware processors implemented by a CPU, a chipset, a buffer, a circuit, etc. which are mounted onto a PCB, and may be designed as an SoC.

The second processor 29 may perform all or some of the foregoing operations of the first processor 9. The second processor 29 controls the electronic device 10 to perform a function corresponding to the proximity event 6 when the proximity event 6 with the electronic device 10 is detected through the second sensor 25.

The second processor 29 identifies the electronic device 10 corresponding to the proximity event 6, identifies the type of the subsequent event 7 when the subsequent event 7 occurs while the electronic device 10 performs a function corresponding to the proximity event 6, and controls the electronic device 10 to perform the function corresponding to the proximity event 6 and the function related to content corresponding to the type of the subsequent event 7 among the plurality of functions related to content providable corresponding to the type of the subsequent event 7.

The configuration of the external device 20 is not limited to that shown in FIG. 2, but may be designed to exclude some elements from the foregoing configuration or include other elements in addition to the foregoing configuration.

The first processor 9 of the electronic device 10 or the second processor 29 of the external device 20 may apply AI technology using a rule-based or AI algorithm to at least one of data analysis, processing, and result-information generation for the operations respectively performed therein, thereby constructing an AI system.

The AI system refers to a computer system that has an intelligence level of a human, in which a machine learns and determines by itself, and gets higher recognition rates the more it is used. The AI algorithm refers to an algorithm that classifies/learns features of input data by itself.

The AI technology is based on elementary technology by using at least one of machine learning, neural network, or deep learning algorithm to copy perception, determination and the like functions of a human brain.

The elementary technology may include at least one of linguistic comprehension technology for recognizing a language/text of a human, visual understanding technology for recognizing an object like a human sense of vision, inference/prediction technology for identifying information and logically making inference and prediction, knowledge representation technology for processing experience information of a human into knowledge data, and motion control technology for controlling a vehicle's automatic driving or a robot's motion.

The linguistic comprehension refers to technology of recognizing and applying/processing a human's language/character, and includes natural language processing, machine translation, conversation system, question and answer, speech recognition/synthesis, etc. The visual understanding refers to technology of recognizing and processing an object like a human sense of vision, and includes object recognition, object tracking, image search, people recognition, scene understanding, place understanding, image enhancement, etc. The inference/prediction refers to technology of identifying information and logically making prediction, and includes knowledge/possibility-based inference, optimized prediction, preference-based plan, recommendation, etc. The knowledge representation refers to technology of automating a human's experience information into knowledge data, and includes knowledge building (data generation/classification), knowledge management (data utilization), etc.

Below, it will be described by way of example that the AI technology using the foregoing AI algorithm is implemented by the first processor 9 of the electronic device 10. However, the same AI technology may also be implemented by the second processor 29 of the external device 20.

The first processor 9 functions as a learner and a recognizer. The learner may perform a function of generating the trained neural network, and the recognizer perform a function of recognizing, inferring, predicting, estimating and identifying the data based on the trained neural network.

The learner generates or updates the neural network. The learner obtains learning data to generate the neural network. For example, the learner obtains the learning data from the first storage 17 or the second storage 27 or from the outside. The learning data may be data used for training the neural network, and the data subjected to the foregoing operations may be used as the learning data for training the neural network.

Before training the neural network based on the learning data, the learner performs a preprocessing operation with regard to the obtained learning data or selects data to be used in the training among a plurality of pieces of the learning data. For example, the learner processes the learning data to have a preset format, apply filtering to the learning data, or processes the learning data to be suitable for the training by adding/removing noise to/from the learning data. The learner uses the preprocessed learning data for generating the neural network which is set to perform the operations.

The learned neural network includes a plurality of neural networks (or layers). The nodes of the plurality of neural networks have weighted values, and the plurality of neural networks are connected to one another so that an output value of a certain neural network can be used as an input value of another neural network. For example, the neural network may include one or more of a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer obtains target data to carry out the foregoing operations. The target data is obtained from the first storage 17 or the second storage 27 or from the outside. The target data may be data targeted to be recognized by the neural network. Before applying the target data to the trained neural network, the recognizer performs a preprocessing operation with respect to the obtained target data, or selects data to be used in recognition among a plurality of pieces of target data. For example, the recognizer processes the target data to have a preset format, applies filtering to the target data, or processes the target data into data suitable for recognition by adding/removing noise. The recognizer obtains an output value output from the neural network by applying the preprocessed target data to the neural network. Further, the recognizer obtains a stochastic value or a reliability value together with the output value.

Figure 3:
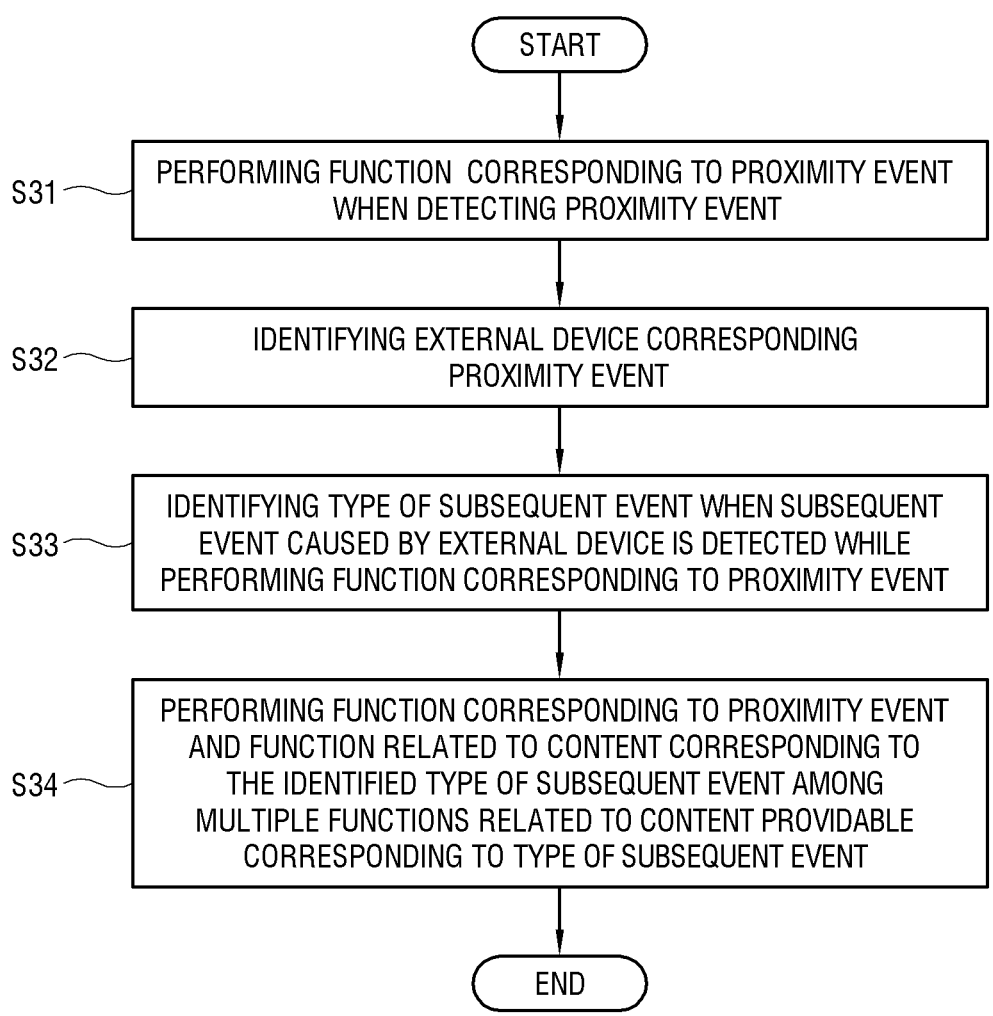
FIG. 3 is a flowchart of a control method of an electronic device, according to an embodiment of the disclosure.

FIG. 3 is a flowchart of a control method of the electronic device of FIG. 1, according to an embodiment of the disclosure.

The operations to be described with reference to FIG. 3 are performed as the first processor 9 executes programs stored in the first storage 17, but will be described as operations performed by the first processor 9 for convenience of description.

The first processor 9 performs the function corresponding to the proximity event 6 when the first sensor 15 detects the proximity event 6 (S31).

The first processor 9 identifies the external device corresponding the proximity event 6 (S32).

The first processor 9 identifies the type of the subsequent event 7 when the subsequent event 7 caused by the external device 20 is detected while performing the function corresponding to the proximity event 6 (S33).

The first processor 9 performs the function corresponding to the proximity event 6 and the function related to content corresponding to the identified type of the subsequent event 7 among the plurality of functions related to content providable corresponding to the type of the subsequent event 7 (S34).

In this way, the first processor 9 performs various functions providable by the electronic device 10 based on at least one of the proximity event 6 or the type of the subsequent event 7, thereby improving the utilization of the near field control as compared with a case of using only the proximity event 6.

Figure 4:
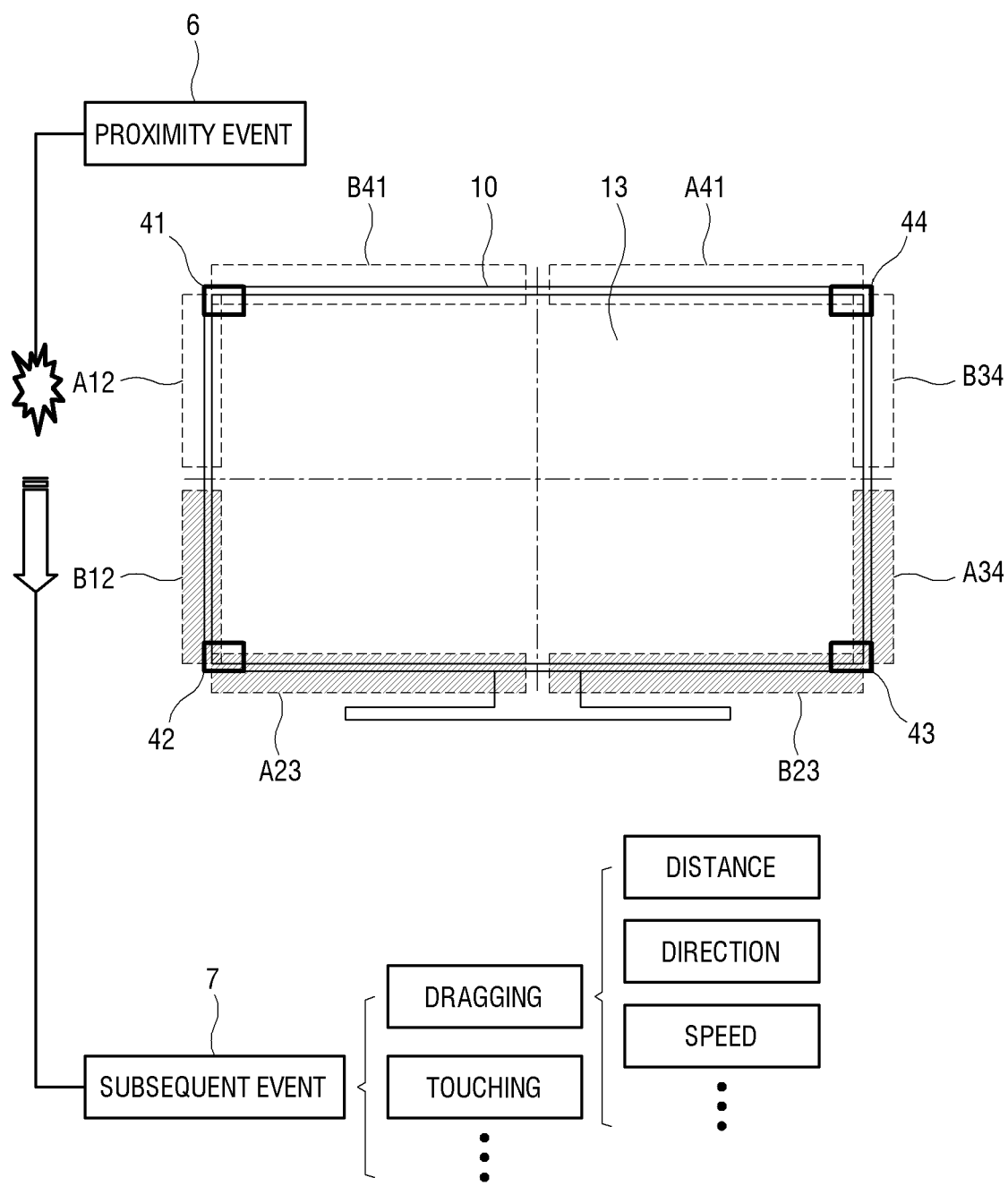
FIG. 4 illustrates a specific example of identifying a proximity event or identifying the type of subsequent event, according to an embodiment of the disclosure.

FIG. 4 illustrates a specific example of identifying a proximity event or identifying the type of subsequent event, in connection with operations S31 and S33 of FIG. 3, according to an embodiment of the disclosure.

The first processor 9 identifies the presence of the proximity event 6, the type of the subsequent event 7, etc. based on the sensor value of the first sensor 15. For convenience of description, it will be assumed that the first sensor 15 includes a plurality of sensors 41, 42, 43, and 44, and the plurality of sensors 41, 42, 43, and 44 are disposed adjacent to four corner areas of the electronic device 10. The four corner areas may include areas adjacent to four corners of the first display 13, or areas adjacent to four corners of the bezel. The bezel may be provided to form the outer appearance of the electronic device 10, and surround the edges of the first display 13. However, the number of first sensors 15, the arranged areas of the first sensors 15, etc. may be variously designed.

Below, the arranged structure of the first sensors 15 will be assumed, and the process of identifying the presence of the proximity event 6, the type of the subsequent event 7, etc. will be described.

The first processor 9 identifies the presence of the proximity event 6 based on the sensor values obtained through the first to fourth sensors 41 to 44. For example, when the first to fourth sensors 41 to 44 are set to obtain a higher sensor value according to closer proximity to the external device 20, and a sensor value obtained by the first sensor 41 and a second sensor value obtained by the second sensor 42 are higher than other sensor values, the first processor 9 may identify that the proximity event 6 occurs in an area A12 or an area B12 among a plurality of areas A12, B12, A23, B23, A34, B34, A41, and B41. The plurality of areas A12, B12, A23, B23, A34, B34, A41, and B41 are areas, in which the proximity event 6 caused by the external device 20 may occur, between two among the first to fourth sensors 41 to 44. When the first sensor value is higher than the second sensor value, the first processor 9 may identify that the proximity event 6 occurs in the area A12. In more detail, when at least one of the first sensor value or the second sensor value is obtained corresponding to a specific position within the area A12, it is identified that the proximity event 6 occurs at that position within the area A12.

Further, the first processor 9 identifies the type of the subsequent event 7 based on the sensor values obtained through the first to fourth sensors 41 to 44 while performing the function corresponding to the proximity event 6. For convenience of description, it will be assumed that the proximity event 6 occurs at a first position within the area A12. When the first sensor value is continuously decreased or the second sensor value is continuously increased while the function corresponding to the proximity event 6 is performed, it may be identified that the external device 20 moves from the first position to a second position of the area B12. When the position of the external device 20 is moved while the function corresponding to the proximity event 6 is performed, the first processor 9 may identify the type of the subsequent event 7 as the dragging.

On the other hand, when the proximity event 6 occurs first in the area A12, and then the first sensor value or the second sensor value is temporarily increased, the first processor 9 may identify that the proximity event occurs again in one of the area A12 and the area B12 or at a specific position of the area A12 or the area B12 while the function corresponding to the first proximity event 6 is performed. When the proximity event occurs again due to temporary change in the sensor value while the function corresponding to the first proximity event 6 is performed, the first processor 9 may identify the type of the subsequent event 7 as the touching.

However, the method of identifying the presence of the proximity event 6, the type of the subsequent event 7, etc. is not limited to the foregoing description, but may be variously designed. For example, when an additional sensor is provided between the first sensor 41 and the second sensor 42, the first processor 9 may identify the presence of the proximity event 6 based on the first sensor value of the first sensor 41, and identify the type of the subsequent event 7 based on an additional sensor value of the additional sensor. In other words, the first processor 9 may use different sensors or different sensor values to identify the presence of the proximity event 6 and the type of the subsequent event 7.

Meanwhile, the type of the subsequent event 7 may include the characteristics of the subsequent event 7. For example, when the type of the subsequent event 7 is identified as the dragging, the first processor 9 may identify the distance, direction, speed, etc. of the dragging. Referring to FIG. 4, when continuous variation in the first sensor value or the second sensor value is detected while performing the function corresponding to the proximity event 6, the first processor 9 may identify the dragging of the external device 20, and identify the distance, direction, speed, etc. of the dragging. However, the method of identifying the characteristics of the subsequent event 7 may be variously designed.

In this way, the first processor 9 may identify the presence of the proximity event 6, the type of the subsequent event 7, etc. based on the sensor value or the variation in the sensor value, so that the presence of the proximity event 6, the type of the subsequent event 7, etc. can be precisely identified, thereby improving the reliability of the functions performed according to the types of the subsequent event 7.

Figure 5:
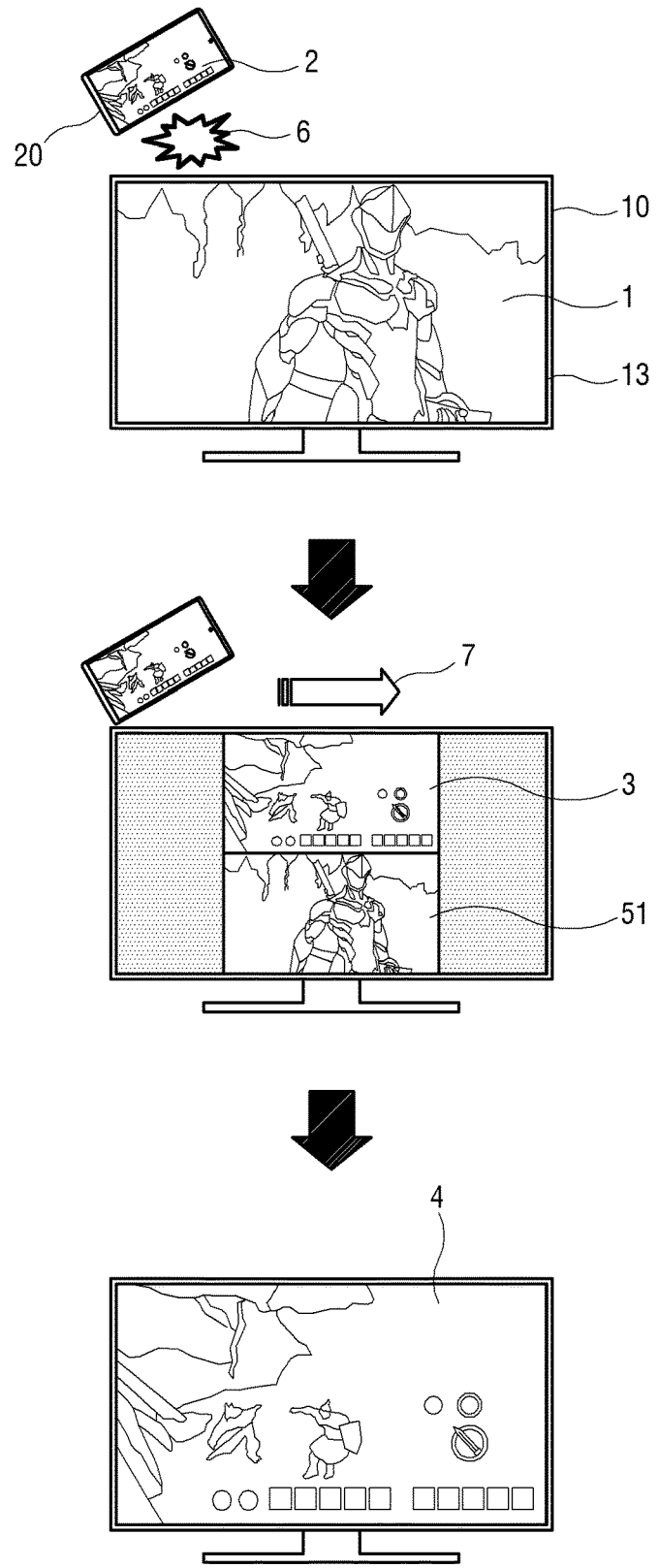
FIG. 5 illustrates a specific example supplementary function of adjusting the size of content image displayed by picture by picture (PBP) according to the types of subsequent event, according to an embodiment of the disclosure.

FIG. 5 illustrates a specific example of adjusting the size of content image displayed by the PBP according to the types of subsequent event, in connection with operation S34 of FIG. 3, according to an embodiment of the disclosure.

The first processor 9 may detect the proximity event 6 when the proximity event 6 caused by the external device 20 occurs. The proximity event 6 includes a touch event. The touch event refers to a kind of contact or contactless event to the electronic device 10. There are no limits to the number of touch events, the touch event includes one touch, two touches, etc. However, the type of the proximity event 6 may be variously set according to the types of user gestures without limitations. Below, for convenience of description, it will be assumed that the proximity event 6 is a touch event based on one touch.

The first processor 9 performs the function corresponding to the proximity event 6. The function corresponding to the proximity event 6 refers to a function providable by the electronic device 10, and includes basic functions such as power on/off, and content sharing functions such as mirroring. As an alternative embodiment to that of FIG. 1, when the proximity event 6 caused by the external device 20 occurs in an upper portion of the electronic device 10 as shown in FIG. 5, the first processor 9 may display the second external content image 3 corresponding to the first external content image 2 of the external device 20 and a second content image 51 corresponding to the first content image 1 by the PBP. The first processor 9 may display the second external content image 3 and the second content image 51 up and down in parallel with each other. Alternatively, when the proximity event 6 occurs on the left portion of the electronic device 10, the first processor 9 may display the second external content image 3 and the second content image 51 left and right in parallel with each other.

The first processor 9 identifies the external device 20 causing the proximity event 6, and identifies the type of the subsequent event 7 when the subsequent event 7 caused by the external device 20 is detected while performing the function corresponding to the proximity event 6. The type of the subsequent event 7 includes the dragging, the touching, etc. However, for convenience of description, it will be assumed that the type of the subsequent event 7 is the dragging.

The first processor 9 performs the function corresponding to the proximity event 6 and the function corresponding to the type of the subsequent event 7 among the plurality of functions related to content providable corresponding to the type of the subsequent event 7. The plurality of functions related to the content providable corresponding to the type of the subsequent event 7 may include the size adjustment, movement, switch, etc. of the second external content image 3 displayed corresponding to the proximity event 6.

The function corresponding to the type of the subsequent event 7 may be variously set according to design. The corresponding function may be set by default, but may be freely set by a user. In this regard, descriptions will be made with reference to FIG. 17.

In the foregoing example of FIG. 1, it has been described that the size of the second external content image 3 is adjusted according to the types of the subsequent event 7 when the second external content image 3 and the first content image 1 are displayed by the PIP in response to the proximity event 6. On the other hand, it will be described below that the size of the second external content image 3 is adjusted according to the types of the subsequent event 7 under a condition different from that of the foregoing embodiment of FIG. 1, i.e., when the second external content image 3 and the second content image 51 corresponding to the first content image 1 are displayed by the PBP in response to the proximity event 6.

As shown in FIG. 5, when the type of the subsequent event 7 is detected as rightward dragging on the upper side, the first processor 9 may adjust the size of the second external content image 3 based on the rightward dragging on the upper side, and display the third external content image 4 adjusted in size. The size may include at least one of the width or height of the second external content image 3.

The first processor 9 may consider the distance, direction, position, etc. of the dragging when adjusting the size of the second external content image 3. For example, the first processor 9 may adjust the size of the second external content image 3 by the distance of the rightward dragging. When the distance of the rightward dragging exceeds a predetermined distance threshold or when the position of the rightward dragging reaches a predetermined position threshold, only the second external content image 3 is displayed without displaying the second content image 51.

In this way, the first processor 9 may display the third external content image 4 adjusted in size according to the types of the subsequent event 7 with respect to the second external content image 3 displayed by the PBP, other than the PIP, in response to the proximity event 6. Therefore, even while various functions are performed corresponding to the proximity event 6, the function corresponding to the type of the subsequent event 7 is performed, thereby improving the utilization of the near field control.

Figure 6:
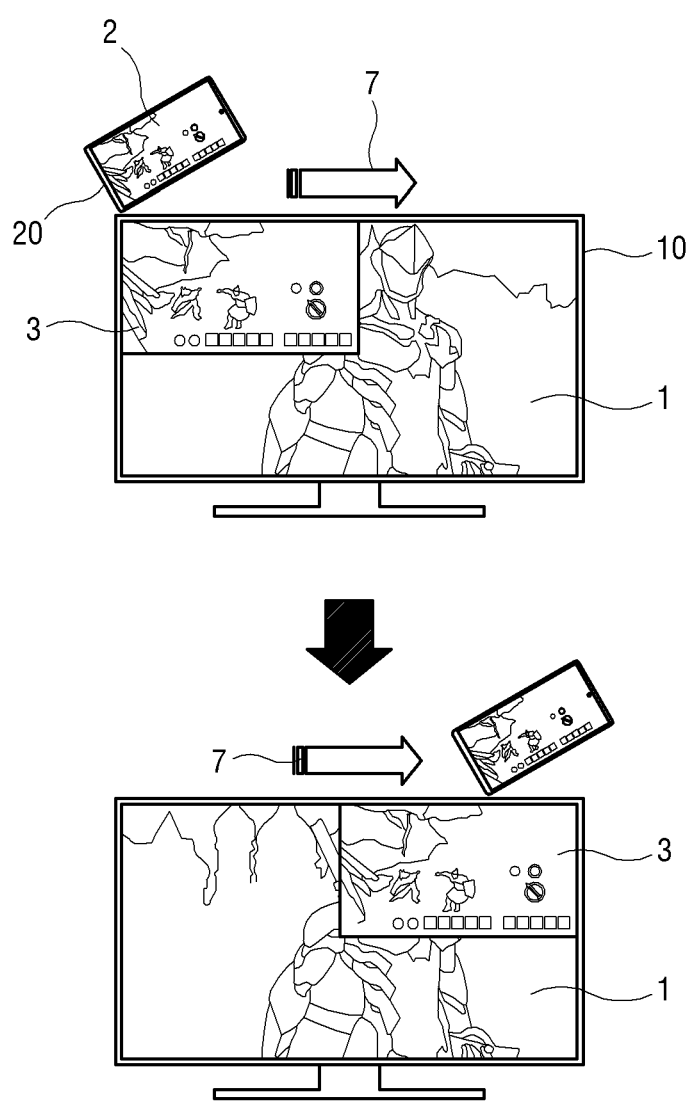
FIG. 6 illustrates a specific example supplementary function of moving the position of content image displayed by picture in picture (PIP) according to the types of subsequent event, according to an embodiment of the disclosure.

FIG. 6 illustrates a specific example of moving the position of content image displayed by the PIP according to the types of subsequent event, in connection with operation S34 of FIG. 3, according to an embodiment of the disclosure.

The first processor 9 performs a function corresponding to the proximity event 6 caused by the external device 20. As shown in FIG. 6, the first processor 9 may display the second external content image 3 corresponding to the first external content image 2 of the external device 20 in the upper left portion of the first display 13 by the PIP in response to the proximity event 6.

When the subsequent event 7 caused by the external device 20 is detected while the function corresponding to the proximity event 6 is performed, the first processor 9 performs the function corresponding to the type of the subsequent event 7. For example, as an alternative to the embodiment of FIG. 1, when the second external content image 3 is displayed in the upper left portion of the first display 13 by the PIP in response to the proximity event 6 as shown in FIG. 6, the first processor 9 may move the position of the second external content image 3 to an upper right portion according to the types of the subsequent event 7. The type of the subsequent event 7 may be the rightward dragging on the upper side. Alternatively, when the type of the subsequent event 7 is downward dragging, the second external content image 3 displayed in the upper left portion may move toward a lower left portion.

The first processor 9 may consider the distance, direction, position, etc. of the subsequent event 7 when moving the position of the second external content image 3. For example, the position of the second external content image 3 may be moved by the distance of the rightward dragging. Alternatively, the first processor 9 may move the position when the distance of the rightward dragging exceeds a predetermined distance threshold or the position of the rightward dragging reaches a predetermined position threshold.

Meanwhile, the first processor 9 may differently set the function corresponding to the type of the subsequent event 7. For example, the first processor 9 may adjust the size of the second external content image 3 based on the rightward dragging on the upper side as shown in FIG. 1, or may move the position of the second external content image 3 based on the rightward dragging on the upper side like this embodiment. The first processor 9 may set the corresponding function differently by additionally considering the distance, position, etc. with respect to the same rightward dragging.

In this way, the first processor 9 moves the position of the second external content image 3, which is being displayed based on the proximity event 6, according to the types of the subsequent event 7, thereby improving the utilization of the near field control.

Figure 7:
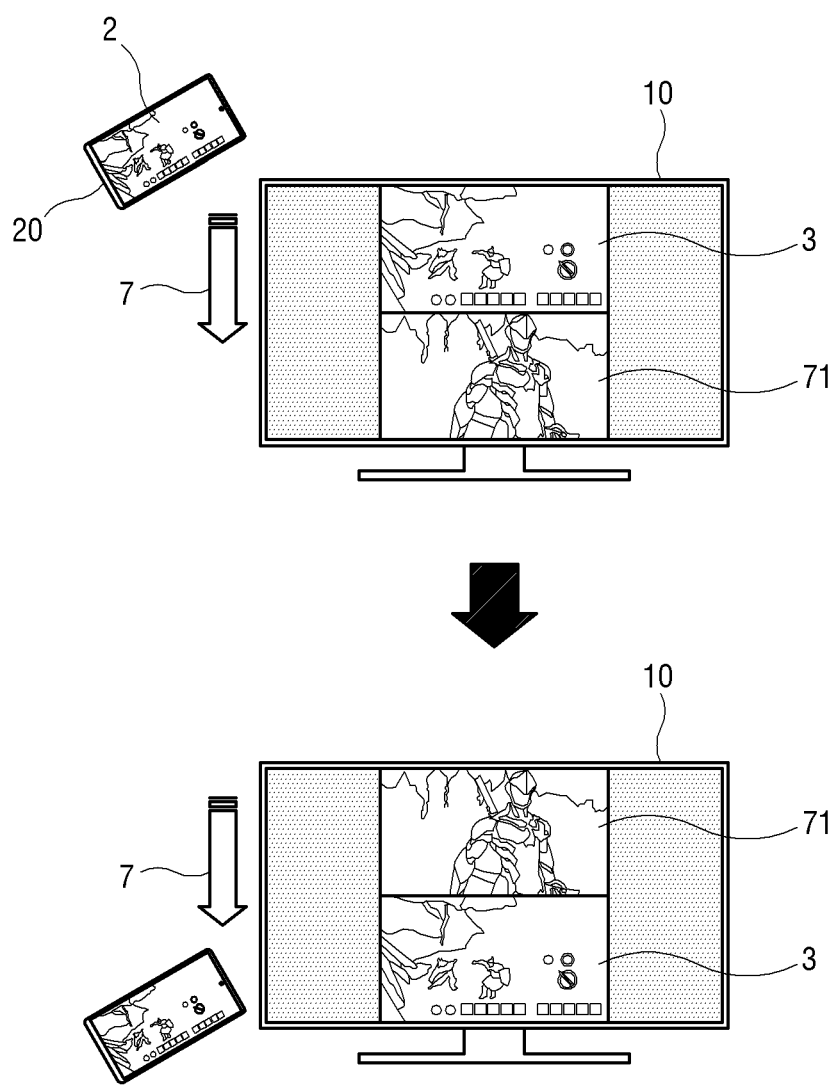
FIG. 7 illustrates a specific example supplementary function of moving the position of content image displayed by PBP according to the types of subsequent event, according to an embodiment of the disclosure.

FIG. 7 illustrates a specific example of moving the position of content image displayed by PBP according to the types of subsequent event, in connection with operation S34 of FIG. 3, according to an embodiment of the disclosure.

The first processor 9 may move the position of the second external content image 3, which is being displayed on the first display 13 in response to the proximity event 6, according to the types of the subsequent event 7. Below, as an alternative to the embodiment of FIG. 6, it will be described that the position of the second external content image 3 is moved based on the type of the subsequent event 7 when the second external content image 3 is displayed by the PBP in response to the proximity event 6.

As shown in FIG. 7, the first processor 9 may process the second external content image 3 and a second content image 71 corresponding to the first content image 1 to be displayed up and down in parallel with each other by the PIP in response to the proximity event 6. The proximity event 6 may be a touch event on the upper portion of the electronic device 10.

When the subsequent event 7 occurs by the external device 20 during the up and down parallel PBP, the first processor 9 identifies the type of the subsequent event 7. For example, when the type of the subsequent event 7 is downward dragging, the second external content image 3 displayed in an upper portion may be moved toward a lower portion, and the second content image 71 may be adaptively moved toward the upper portion. While maintaining the up and down parallel PBP, the positions of the second external content image 3 and the second content image 71 may be switched with each other.

The first processor 9 may consider the distance, direction, position, etc. of the subsequent event 7 when moving the position of the second external content image 3. For example, the position of the second external content image 3 may be moved by a distance of downward dragging. The first processor 9 may be designed to move the position when the distance of the downward dragging exceeds a predetermined distance threshold or the position of the downward dragging reaches a predetermined position threshold.

In this way, the first processor 9 may move the position of the second external content image 3, which is being displayed corresponding to the proximity event 6, based on the type of the subsequent event 7, thereby improving the utilization of the near field control.

Figure 8:
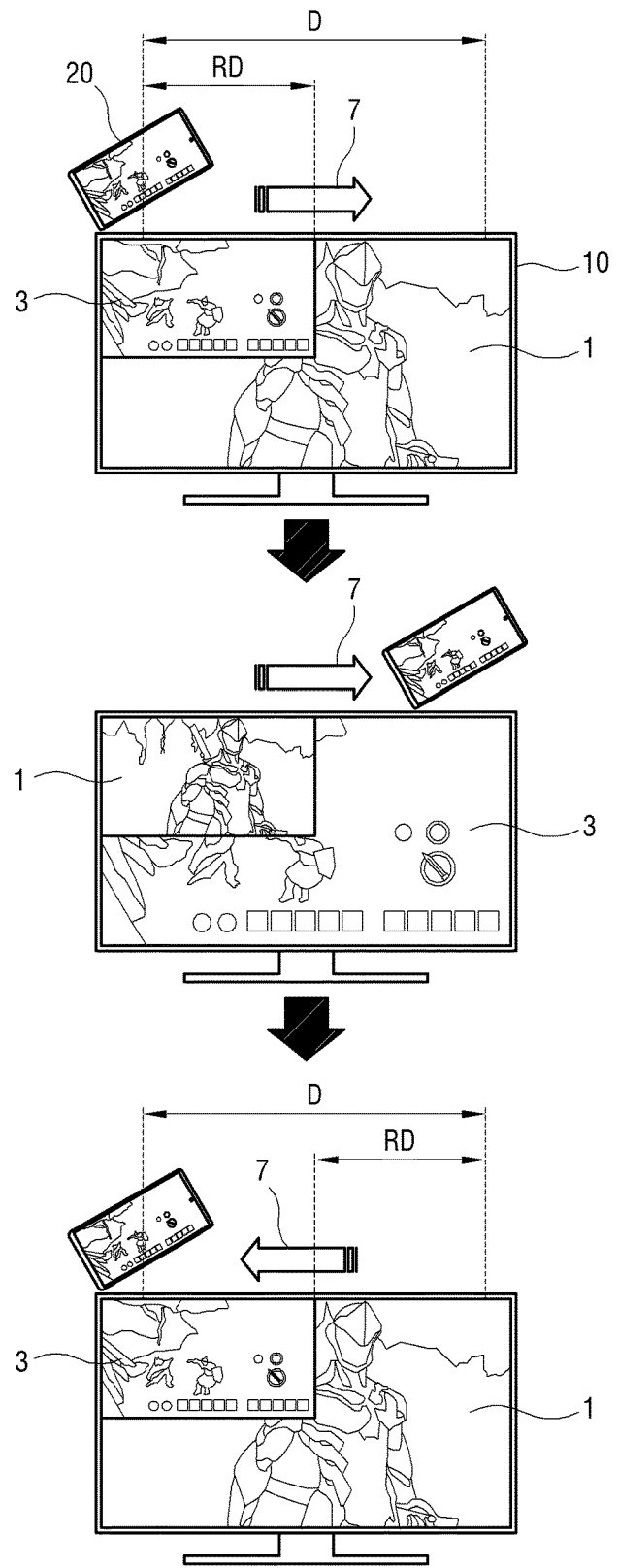
FIG. 8 illustrates a specific example supplementary function of switching and displaying a content image according to the types of subsequent event, according to an embodiment of the disclosure.

FIG. 8 illustrates a specific example of switching and displaying a content image according to the types of subsequent event, in connection with operation S34 of FIG. 3, according to an embodiment of the disclosure.

In the case of the dragging type of the subsequent event 7, the first processor 9 may change the display position of the second external content image 3 corresponding to the proximity event 6 when the distance D of the dragging exceeds a predetermined threshold RD. For convenience of description, it will be assumed that the second external content image 3 is displayed together with the first content image 1 by the PIP based on the proximity event 6. In other words, as shown in FIG. 8, the second external content image 3 may be displayed as a sub image, overlapping the first content image 1, i.e., a main image. However, a user may want the second external content image 3 to be displayed as the main image. In this regard, the first processor 9 may display the second external content image 3 as the main image or perform image switching with the first content image 1.

In more detail, when the type of the subsequent event 7 is the rightward dragging in the state that the second external content image 3 is displayed as the sub image on the first content image 1, i.e., the main image by the PIP based on the proximity event 6, the first processor 9 may perform the image switching so that the second external content image 3 can be displayed as the main image.

The first processor 9 may perform the image switching according to whether the distance D of the subsequent event 7 exceeds a predetermined distance threshold RD. Thus, the image switching is distinguished from other functions performed corresponding to the type of the subsequent event 7. For example, the first processor 9 performs the size adjust, position movement, etc. for the second external content image 3 when the distance D of the subsequent event 7 does not exceed the distance threshold RD, but performs the image switching when the distance D of the subsequent event 7 exceeds the distance threshold RD. The distance threshold RD may be divided into several stages, and the size adjustment, the position movement, the image switching, etc. may be performed for the first external content image 2 when the distance D of the subsequent event 7 corresponds to each stage of the distance threshold RD.

On the other hand, when the type of the subsequent event 7 is leftward dragging in the state that the first content image 1 is displayed as the sub image by the image switching, the first processor 9 may perform the image switching again to display the second external content image 3 as the sub image.

In this way, the first processor 9 performs image displaying or image switching based on the type of the subsequent event 7 with respect to the second external content image 3 displayed corresponding to the proximity event 6, thereby improving the utilization of the near field control.

Figure 9:
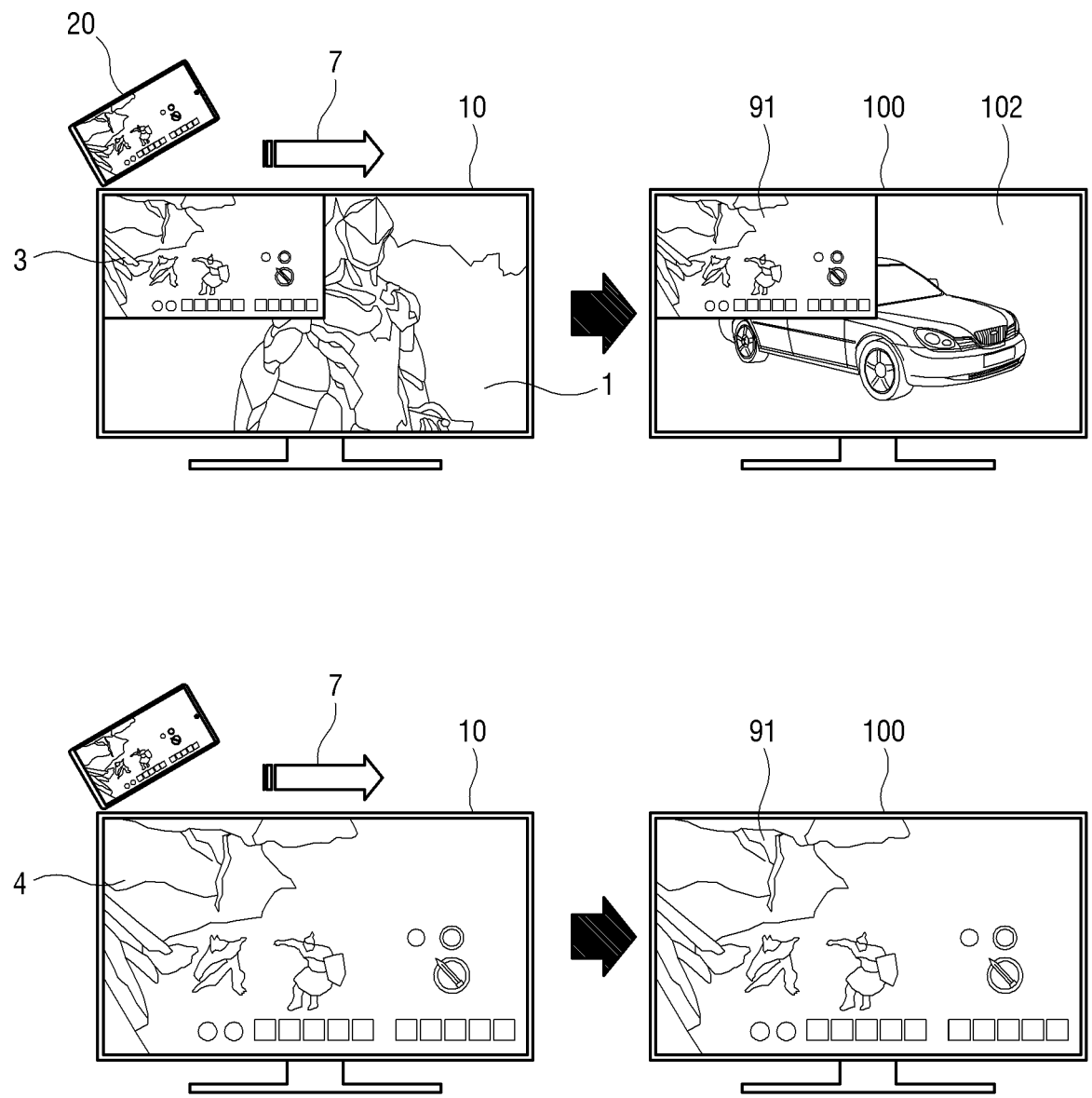
FIG. 9 illustrates a specific example supplementary function of transmitting data of content to an external output device according to the types of subsequent event, according to an embodiment of the disclosure.

FIG. 9 illustrates a specific example of transmitting data of content to an external output device according to the types of subsequent event, in connection with operation S34 of FIG. 3, according to an embodiment of the disclosure.

The first processor 9 controls the interface 11 to transmit the data of the second external content image 3 to an external output device 100 corresponding to the direction of the subsequent event 7.

As an alternative to the embodiment of FIG. 1, as shown in FIG. 9, it will be assumed that the second external content image 3 is displayed by the PIP in response to the proximity event 6. The first processor 9 may transmit the data of the second external content image 3 to the external output device 100 based on the type of the subsequent event 7 while the second external content image 3 is displayed by the PIP. When the type of the subsequent event 7 is the dragging, and a content image 102 is being displayed on the external output device 100, the external output device 100 may receive the data of the second external content image 3 and display a content image 91 corresponding to the second external content image 3. The first processor 9 may transmit information about a display type while transmitting the data of the second external content image 3, so that the external output device 100 can display the content image 91 corresponding to the second external content image 3 and the content image 102 by the PIP or PBP.

When there are a plurality of external output devices, the data of the second external content image 3 may be transmitted to the external output device 100 corresponding to the direction of the dragging. For example, it will be assumed that the plurality of external output devices are disposed on all sides around the electronic device 10, and the external output device 100 shown in FIG. 9 is disposed adjacent to the right side of the electronic device 10. In this case, when the type of the subsequent event 7 is the rightward dragging, the first processor 9 may transmit the data of the second external content image 3 to the external output device 100 disposed adjacent to the right side of the electronic device 10.

Meanwhile, as described with reference to FIG. 8, when the type of the subsequent event 7 is the rightward dragging in the state that only the second external content image 3 is being displayed as the main image by the image switching, the first processor 9 may transmit the data of the second external content image 3 to the external output device 100 disposed adjacent to the right side of the electronic device 10. When the first content image 1 is being displayed as the main image before the image switching, the first processor 9 may transmit the data of the first content image 1 to the external output device 100 disposed adjacent to the right side of the electronic device 10 in response to the rightward dragging.

When the second external content image 3 and the first content image 1 are displayed by the PIP or PBP, which image data of the second external content image 3 or the first content image 1 will be transmitted may be varied depending on what function is set to correspond to the rightward dragging.

In this way, the first processor 9 may transmit the data of the second external content image 3 or the first content image 1 in response to the type of the subsequent event 7 while performing the function corresponding to the proximity event 6, thereby improving the utilization of the near field control.

Figure 10:
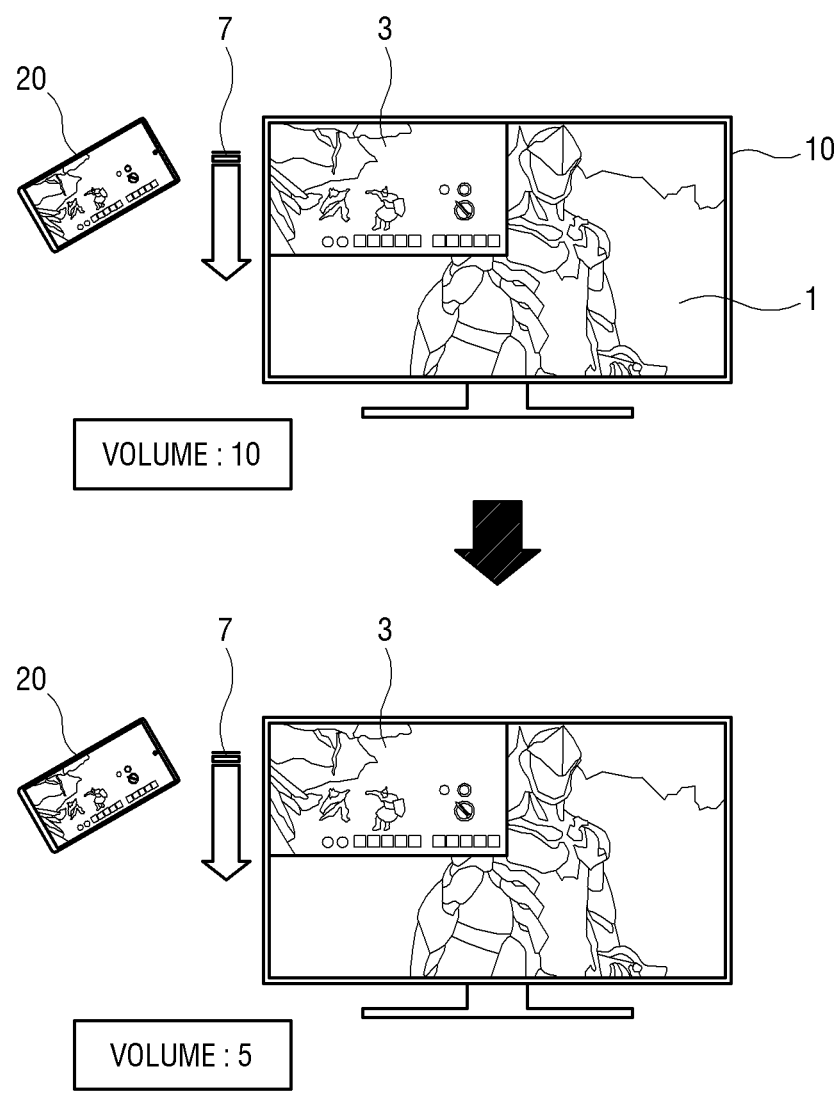
FIG. 10 illustrates a specific example supplementary function of adjusting a level of a content sound according to the types of subsequent event, according to an embodiment of the disclosure.

FIG. 10 illustrates a specific example of adjusting a level of a content sound according to the types of subsequent event, in connection with operation S34 of FIG. 3, according to an embodiment of the disclosure.

The first processor 9 may adjust a sound level of content, which is being output through the first loudspeaker 16 in response to the proximity event 6, to correspond to the type of the subsequent event 7, i.e., the dragging. For convenience of description, it will be assumed that the second external content image 3 and the first content image 1 are displayed by the PIP based on the proximity event 6, and an external sound is output. The external sound includes a sound output corresponding to the second external content image 3 of the external device 20.

The first processor 9 may perform a function related to the external sound in response to the type of the subsequent event 7. For example, when the type of the subsequent event 7 is downward dragging, the first processor 9 may turn down the volume of the external sound being currently output. When the minimum volume is set to '10', the volume may be turned down to '5' based on the downward dragging. A degree of volume control may be varied depending on the distance, speed, etc. of the downward dragging. Even when the sound is output corresponding to the first content image 1, the volume of a first content sound may be controlled in the same manner.

In this way, the first processor 9 adjusts the level of the content sound in response to the type of the subsequent event 7 while performing the function corresponding to the proximity event 6, thereby improving the utilization of the near field control.

FIG. 11 illustrates a specific example of selecting a loudspeaker to output a content sound according to the types of subsequent event, in connection with operation S34 of FIG. 3, according to an embodiment of the disclosure.

The first processor 9 may control a content sound output through one of a plurality of loudspeakers 16 to be output through another loudspeaker corresponding to the direction of the dragging in response to the proximity event 6. For convenience of description, it will be assumed that the second external content image 3 is displayed by the PIP and the external sound corresponding to the second external content image 3 is output through the first loudspeaker 16 in response to the proximity event 6.

When an external sound output ratio of a plurality of loudspeakers 111 and 112 is initially set to 50% for a first loudspeaker 111 and 50% for the second loudspeaker 112, the external sound output ratio is changed to 0% for the first loudspeaker 111 and 100% for the second loudspeaker 112 in response to the type of the subsequent event 7. When the first loudspeaker 111 is provided at the left side of the electronic device 10 and the second loudspeaker 112 is provided at the right side of the electronic device 10, the first processor 9 may change the external sound output ratio for the second loudspeaker 112 to be increased corresponding to the rightward dragging. When four loudspeakers are provided at four corners of the electronic device 10, the output ratio may be generally adjusted in the same manner according to upward, downward, leftward or rightward dragging. A degree of output ratio change may be varied depending on the distance, speed, etc. of the dragging. Even when a sound is output corresponding to the first content image 1, the output ratio for the first content sound may be adjusted according to the plurality of loudspeakers 111 and 112.

In this way, the first processor 9 adjusts the output ratio of the first loudspeaker 16 for the output sound may be adjusted according to the type of the subsequent event 7 while performing the function corresponding to the proximity event 6, thereby improving the utilization of the near field control.

FIG. 12 illustrates a specific example of switching and outputting a content sound according to the types of subsequent event, in connection with operation S34 of FIG. 3, according to an embodiment of the disclosure.

The first processor 9 may perform sound switching between the first content sound corresponding to the first content image 1 and an external sound corresponding to the second external content image 3 according to the types of the subsequent event 7. For convenience of description, it will be assumed that the first content sound corresponding to the first content image 1 is output while the second external content image 3, i.e., the sub image and the first content image 1, i.e., the main image are being displayed by the PIP based on the proximity event 6, the first content image 1.

The first processor 9 may switch an output sound when the type of the subsequent event 7 is rightward dragging. The first processor 9 may output an external sound instead of the first content sound by the output sound switching. The sound switching based on the rightward dragging may be performed when the distance D of the rightward dragging exceeds a predetermined distance threshold RD. On the other hand, when left dragging is detected while the external sound is being output by the sound switching, the first processor 9 may switch the output sound again. The first processor 9 may output the first content sound by the re-switching of the output sound. When the distance D of the leftward dragging exceeds a predetermined distance threshold RD, the sound switching is performed again, thereby outputting the first content sound.

In this way, the first processor 9 switches between the first content sound and the external sound based on the type of the subsequent event 7, thereby improving the utilization of the near field control.

Figure 13:
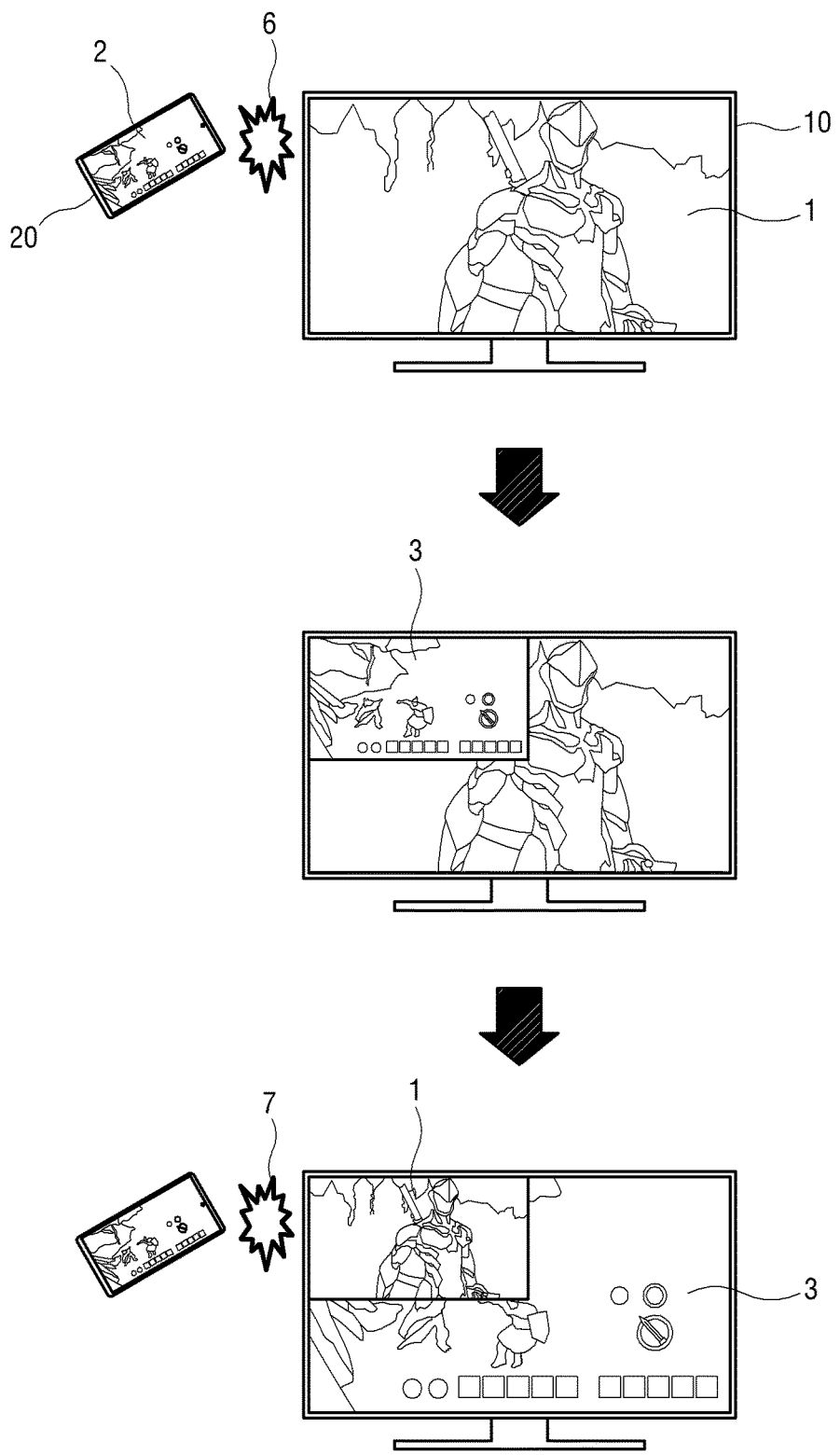
FIG. 13 illustrates a specific example supplementary function of switching and outputting a content sound according to the types of subsequent event, according to an embodiment of the disclosure.

FIG. 13 illustrates a specific example of switching and outputting a content sound according to the types of subsequent event, in connection with operation S34 of FIG. 3, according to an embodiment of the disclosure.

Even when the type of the subsequent event 7 is touching, the first processor 9 may perform a function corresponding to the proximity event 6 and a function corresponding to the touching among the plurality of functions related to content providable corresponding to the type of the subsequent event 7.

As shown in FIG. 13, when the type of the identified subsequent event 7 is the touching while the function corresponding to the proximity event 6 is performed in the state that the second external content image 3 is displayed as the sub image in response to the proximity event 6, the first processor 9 performs the image switching, thereby displaying the second external content image 3 as the main image.

When the type of the subsequent event 7 is the touching, the first processor 9 may perform a function corresponding to the second external content image 3 according to the number of touching times. For example, the image switching may be set to be performed when the touching occurs once, the size of an image may be set to be adjusted at a certain ratio when the touching occurs twice, and the position of the image may be set to be moved to a predetermined position when the touching occurs three times. However, the function corresponding to the subsequent event 7, i.e., the number of touching times may be variously designed.

In this way, the first processor 9 performs a function related to the second external content image 3 based on the touching type of the subsequent event 7 while the function corresponding to the proximity event 6 is performed, thereby improving the utilization of the near field control.

Figure 14:
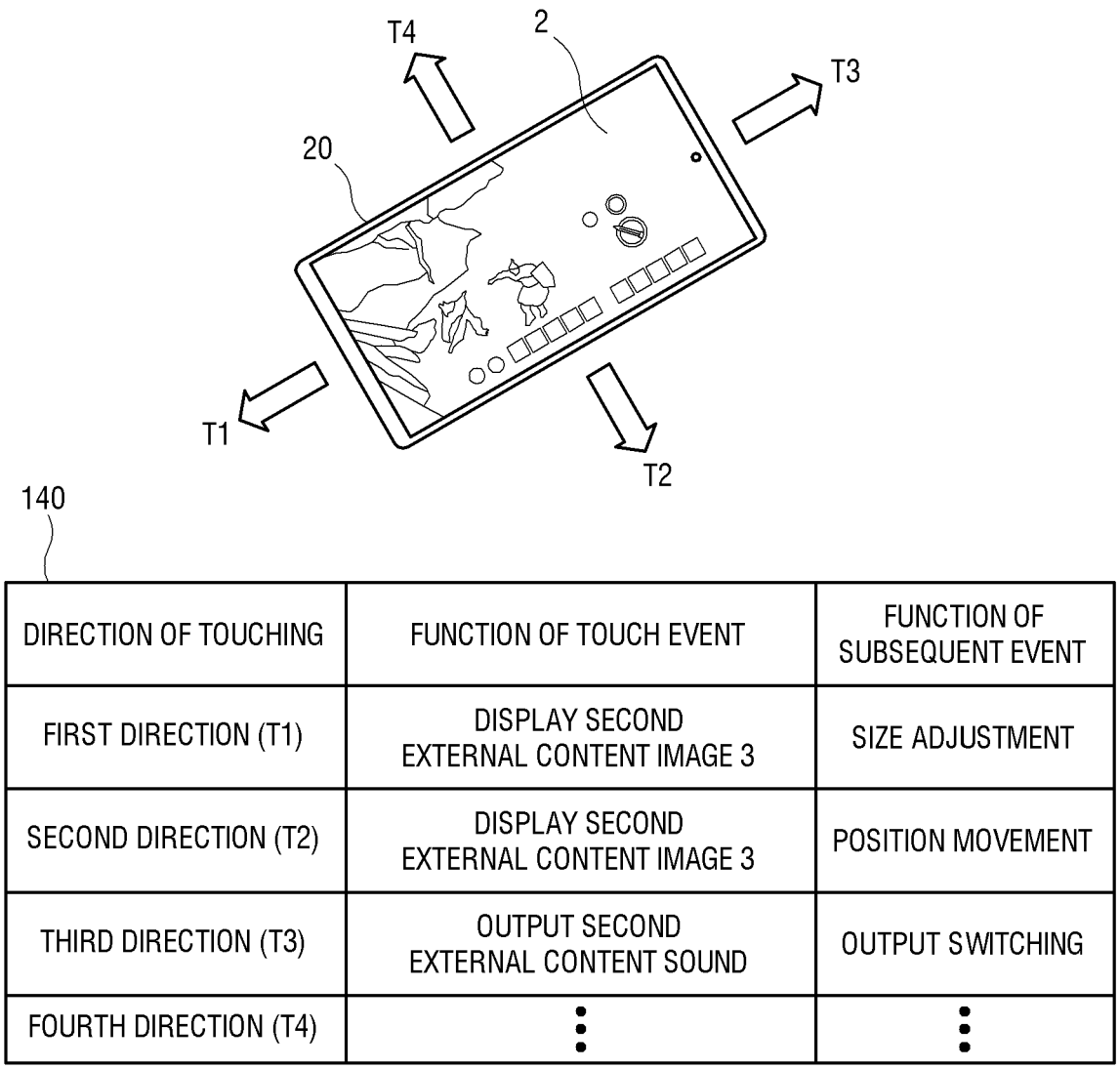
FIG. 14 illustrates a specific example initial or supplementary function about content according to touch directions of a proximity event or subsequent event, according to an embodiment of the disclosure.

FIG. 14 illustrates a specific example of executing a function about content according to touch directions of a proximity event or subsequent event, in connection with operations S31 or S34 of FIG. 3, according to an embodiment of the disclosure.

The first processor 9 may receive information about a touching direction of the proximity event 6 or the subsequent event 7 from the external device 20, and perform a function corresponding to the touching direction.

As shown in FIG. 14, the first processor 9 may receive information about the proximity event 6, which occurs in a first direction T1 among a plurality of directions T1, T2, T3 and T4 of the external device 20, from the external device 20 when the proximity event 6 occurs. The first processor 9 identifies that the direction of touching the external device 20 is the first direction T1 based on the received information. The first processor 9 may display the second external content image 3 as a function corresponding to the first direction T1 among the plurality of functions corresponding to the plurality of touching directions T1, T2, T3 and T4 when the proximity event 6 occurs. The first processor 9 may identify that the direction of touching the external device 20 is the third direction T3, and output the second external content sound corresponding to the second external content image 3 as a function corresponding to the third direction T3. The third direction T3 includes a direction where a second loudspeaker 26 of the external device 20 is provided. However, the plurality of functions corresponding to the plurality of touching directions T1, T2, T3 and T3 based on the proximity event 6 is not limited to the foregoing description, and may be variously designed.

The first processor 9 may receive information about the touching direction of the subsequent event 7 when the subsequent event 7 occurs while the function corresponding to the proximity event 6 is performed, and perform a function corresponding to the touching direction identified based on the received information. For example, when the touching direction of the subsequent event 7 is the first direction T1, the first processor 9 may adjust the size of the second external content image 3 as the function corresponding to the first direction T1 among the plurality of functions corresponding to the plurality of touching directions T1, T2, T3 and T4 when the subsequent event 7 occurs.

Alternatively, when the touching direction of the proximity event 6 is the first direction T1, and the touching direction of the subsequent event 7 is the second direction T2, the first processor 9 may display the second external content image 3 and subsequently move the position of the second external content image 3.

Meanwhile, the touching direction of the subsequent event 7 may include a touching direction with the external device 20 at the dragging. For example, when the touching direction of the proximity event 6 is the first direction T1, and the subsequent event 7 is the dragging occurred in the state that the touching direction of the external device 20 is the first direction T1, the first processor 9 may display the second external content image 3 to correspond to the first direction T1 at the proximity event 6, and adjust the size of the second external content image 3 to correspond to the first direction T1 at the subsequent event 7.

The first processor 9 may reference information 140 related to the function for each touching direction shown in FIG. 14 to perform the functions corresponding to the directions. The information 140 about the function for each touching direction may be stored in the first storage 17 in the form of a lookup table.

In this way, the first processor 9 performs the function corresponding to the touching direction of the proximity event 6 or the subsequent event 7, thereby improving the utilization of the near field control.

Figure 15:
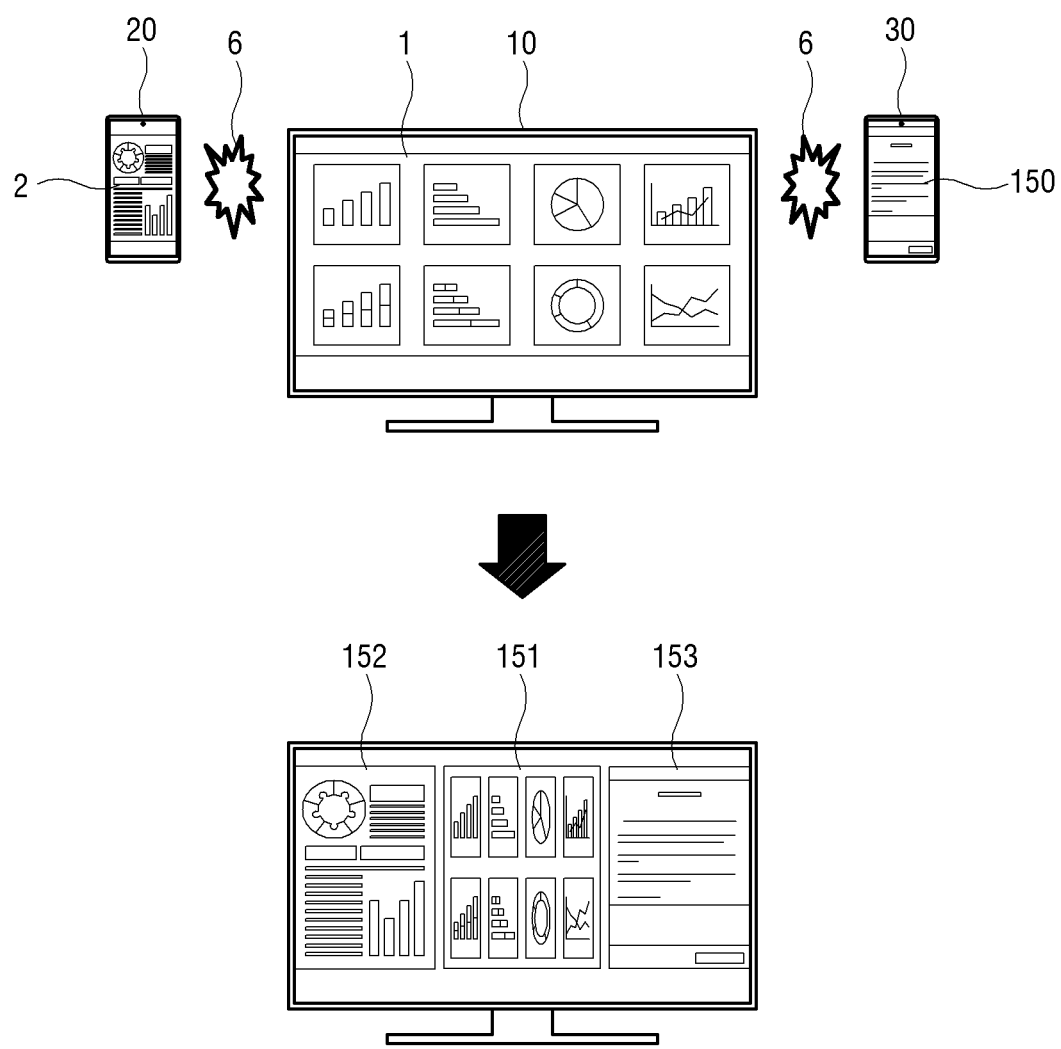
FIG. 15 illustrates a specific example initial or supplementary function about content according to the types of proximity event or subsequent event by a plurality of external devices, according to an embodiment of the disclosure.

FIG. 15 illustrates a specific example of executing a function about content according to the types of proximity event or subsequent event by a plurality of external devices, in connection with operations S31 or S34 of FIG. 3, according to an embodiment of the disclosure.

The first processor 9 may output a plurality of pieces of content 152 and 153 respectively corresponding to a plurality of external devices 20 and 30 in response to a plurality of proximity events 6 caused by the plurality of external devices 20 and 30.

The first processor 9 may detect the plurality of proximity events 6 caused by the plurality of external devices 20 and 30. The plurality of proximity events 6 includes a plurality of proximity events caused by the plurality of external devices 20 and 30 of one user, a plurality of proximity events caused by the plurality of external devices 20 and 30 of different users, etc. Further, difference in detection time between the plurality of proximity events 6 may be within a predetermined time threshold.

The first processor 9 may perform a function related to a plurality of second external content images 152 and 153 corresponding to the plurality of external devices 20 and 30 in response to the plurality of proximity events 6. For example, as shown in FIG. 15, the plurality of second external content images 152 and 153 of the plurality of external devices 20 and 30 may be displayed by the PBP in response to the plurality of proximity events 6. When the plurality of proximity events 6 respectively occur at opposite sides of the electronic device 10, the first processor 9 may display the plurality of second external content images 152 and 153 corresponding to a plurality of first external content images 2 and 150 displayed on the plurality of external devices 20 and 30 by the PBP. In other words, the plurality of second external content images 152 and 153 may be displayed left and right in parallel with the second content image 151 corresponding to the first content image 1 by the PBP.

The first processor 9 may perform a function corresponding to the subsequent event 7 caused by the plurality of external devices 20 and 30. For example, when the downward dragging on the left side caused by the first external device 20 is detected in the state that the plurality of second external content images 152 and 153 are displayed by the PBP, the first processor 9 may perform the size adjustment, position movement, etc. as a function for the second external content image 3 displayed corresponding to the proximity event 6 of the first external device 20. The subsequent events caused by for the plurality of external devices 20 and 30 may occur at the same time, and in this case the functions may be performed for the second external content images 152 and 153, respectively.

Alternatively, when the leftward dragging on the upper side caused by the second external device 30 is detected, the first processor 9 may change the display order of the plurality of second external content images 152 and 153 and the second content image 151 which are displayed side by side by the PBP.

In this way, the first processor 9 performs a function corresponding to the plurality of proximity events 6 or the plurality of subsequent events 7, thereby improving the utilization of the near field control.

Figure 16:
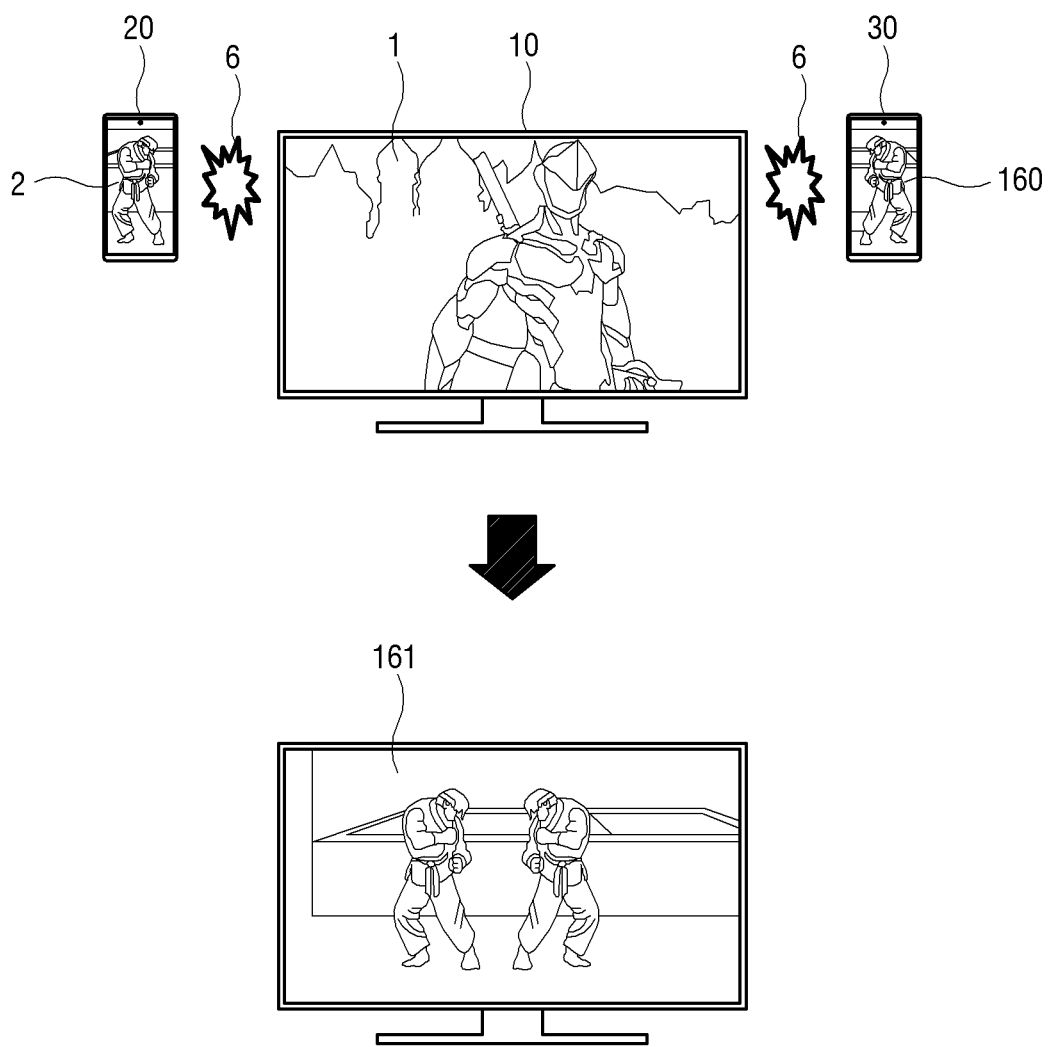
FIG. 16 illustrates another example initial or supplementary function about content according to the types of proximity event or subsequent event by a plurality of external devices, according to an embodiment of the disclosure.

FIG. 16 illustrates another example of executing a function about content according to the types of proximity event or subsequent event by a plurality of external devices, in connection with operations S31 or S34 of FIG. 3, according to an embodiment of the disclosure.

As shown in FIG. 16, the first processor 9 may detect the plurality of proximity events 6. For convenience of description, it will be assumed that the plurality of proximity events 6 are the plurality of proximity events 6 caused by the plurality of external devices 20 and 30 of different users.

For example, when a plurality of users execute the same fighting game application and select different game characters to display respective character images 2 and 160, the first processor 9 may display a fighting game image 161, in which the game characters are selected, in response to the plurality of proximity events 6 on the both sides of the electronic device 10. The fighting game image 161 may be displayed by mirroring from at least one external device 20 or 30 in response to the proximity event 6, or may be displayed as the fighting game application is executed by the first processor 9 based on the information about the fighting game received from at least one external device 20 or 30.

Meanwhile, the first processor 9 may perform a function related to the fighting game in response to the subsequent event 7 caused by the plurality of external devices 20 and 30. For example, when the downward dragging caused by the first external device 20 is detected, the first processor 9 displays the game character corresponding to the first external device 20 to be moved corresponding to the downward dragging, thereby allowing a plurality of users to play the fighting game.

In this way, the first processor 9 performs the function corresponding to the plurality of proximity events 6 or the plurality of subsequent events 7, thereby improving the utilization of the near field control.

FIG. 17 illustrates a specific example of setting a function to be performed corresponding to a subsequent event, in connection with operation S34 of FIG. 3, according to an embodiment of the disclosure.

The first processor 9 may induce a user to in person set which function will be performed corresponding to the type of the subsequent event 7. For example, as shown in FIG. 17, the first processor 9 displays a user interface (UI) 170 showing a plurality of types of the subsequent event 7 and a plurality of providable functions. The providable functions include the function corresponding to the proximity event 6 and the plurality of functions providable corresponding to the type of the subsequent event 7. The first processor 9 may perform the function corresponding to the type of the subsequent event 7 as matched by a user through the UI 170.

For example, as matched through the UI 170, the first processor 9 may transmit the second external content image 3 to the external output device 100 according to the speed of the subsequent event 7. In more detail, when the type of the subsequent event 7 is the dragging, the second external content image 3 may be set to be transmitted to the external output device 100 only when the speed of the dragging exceeds a first speed threshold.

In this way, the first processor 9 includes the function corresponding to the subsequent event 7 to be set by a user's convenience, thereby improving the utilization of the near field control.

Figure 18:
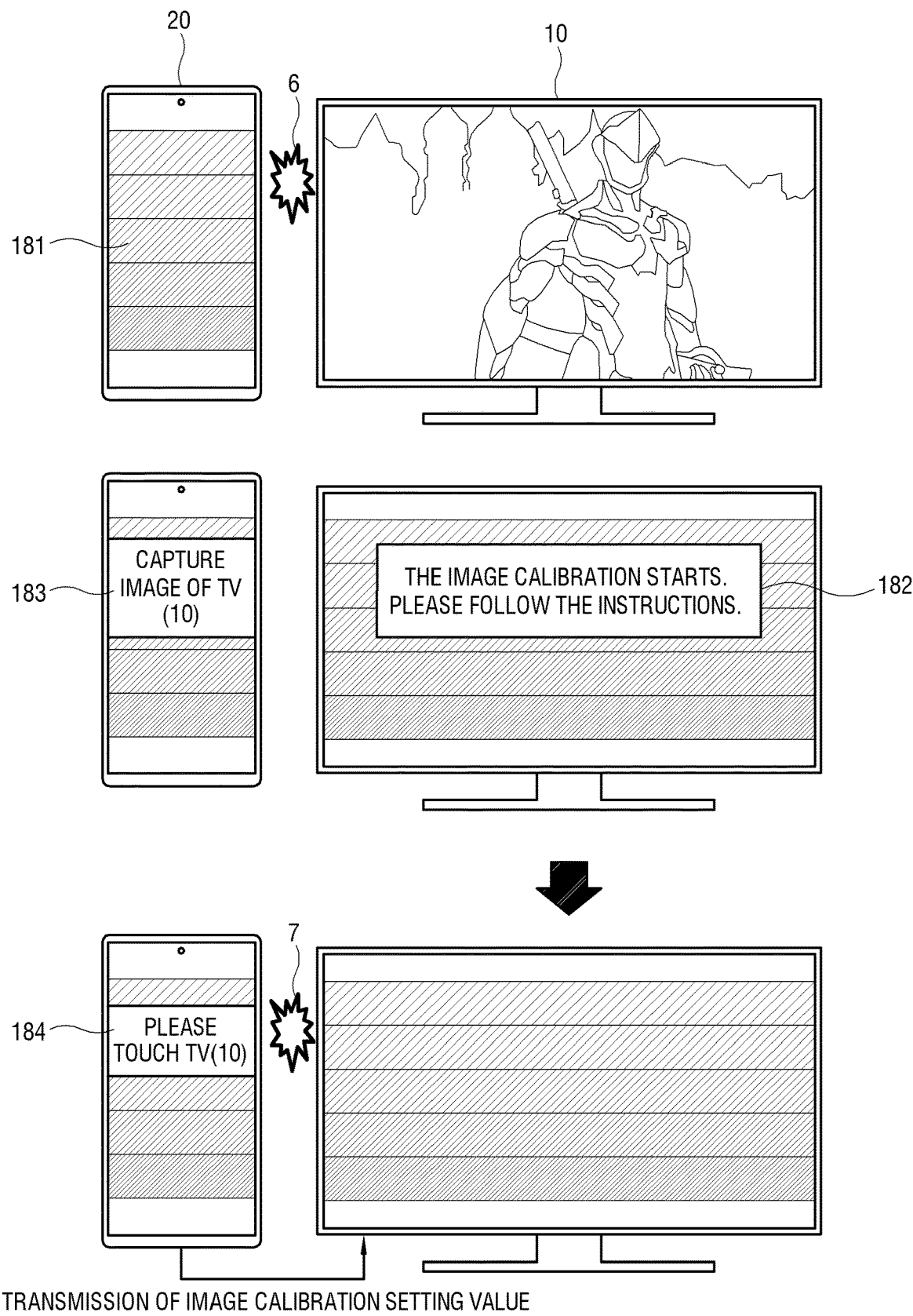
FIG. 18 illustrates a specific example initial or supplementary function of calibrating screen characteristics corresponding a proximity event or a subsequent event, according to an embodiment of the disclosure.

FIG. 18 illustrates a specific example of calibrating screen characteristics corresponding a proximity event or a subsequent event, in connection with operation S31 or S34 of FIG. 3, according to an embodiment of the disclosure.

The first processor 9 may perform various functions corresponding to the proximity event 6 or the subsequent event 7. For example, as shown in FIG. 18, when a user makes the proximity event 6 through the external device 20 where an image calibration application 181 is running, the first processor 9 may perform an image calibration function for the first display 13. The first processor 9 may receive information about the image calibration application executed in the external device 20 when the proximity event 6 occurs, and perform the image calibration function based on the received information.

The image calibration function refers to a process of calibrating difference in color, brightness, etc. between a plurality of pixels forming the first display 13, and it is difficult for a general user to know the process in detail. Therefore, the first processor 9 guides a user about what action to take once the image calibration function is performed, so that the image calibration can be smoothly performed.

For example, the first processor 9 may display a message 182 notifying that the image calibration function has started, and displays an image for the image calibration. The first processor 9 may directly display the message or control the external device 20 to display a corresponding message 183 in order to induce the external device 20 to capture the image for the image calibration.

When the external device 20 obtains a setting value for calibrating an image by capturing the image for the image calibration, the first processor 9 may display a message 184 notifying that the subsequent event 7 needs to be performed to receive the obtained setting value. When receiving the setting value from the external device 20 according to the message 184 requiring the subsequent event 7, the first processor 9 may calibrate the image based on the received setting value.

In this way, the first processor 9 performs the image calibration based on the proximity event 6 and the type of the subsequent event 7, thereby improving use convenience in the image calibration.

Figure 19:
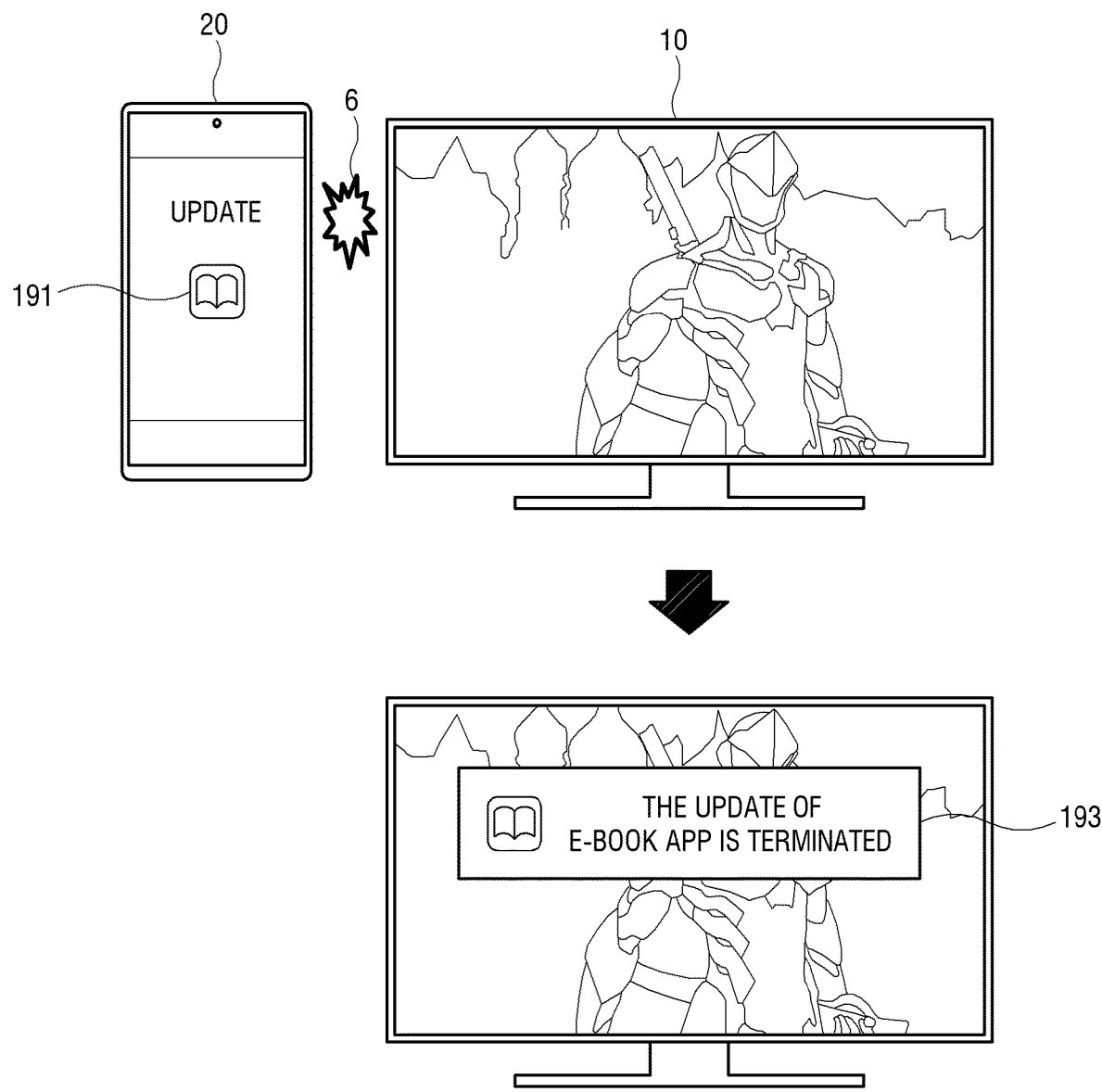
FIG. 19 illustrates a specific example initial or supplementary function of updating an application corresponding to a proximity event, according to an embodiment of the disclosure.

FIG. 19 illustrates a specific example of updating an application corresponding to a proximity event, in connection with operation S31 or S34 of FIG. 3, according to an embodiment of the disclosure.

As shown in FIG. 19, the first processor 9 may update the application of the electronic device 10 through the proximity event 6. For example, when a user makes the proximity event 6 with the external device 20 in which an application identified to need to be updated among a plurality of applications of the electronic device 10, the first processor 9 may update that application.

The first processor 9 may receive information about the application selected to be updated in the external device 20 when the proximity event 6 occurs, and update that application based on the received information. When the update of the application is started or completed, the first processor 9 may display a message 191 notifying that the update is started or completed.

When the subsequent event 7 is detected while updating the application based on the proximity event 6, the first processor 9 may suspend or terminate the update of the application according to the type of the detected subsequent event 7. When the update of the application is suspended or terminated, the first processor 9 may display a message 193 related to the suspected or terminated update. For example, when the type of the subsequent event 7 is the dragging, the first processor 9 may suspend the update of the application, and adjust a suspending time according to the distance, speed, and direction of the dragging.

In this way, the first processor 9 may update the application based on the proximity event 6, and perform a function related to the update of the application based on the type of the subsequent event 7, thereby improving use convenience in updating the application.

Figure 20:
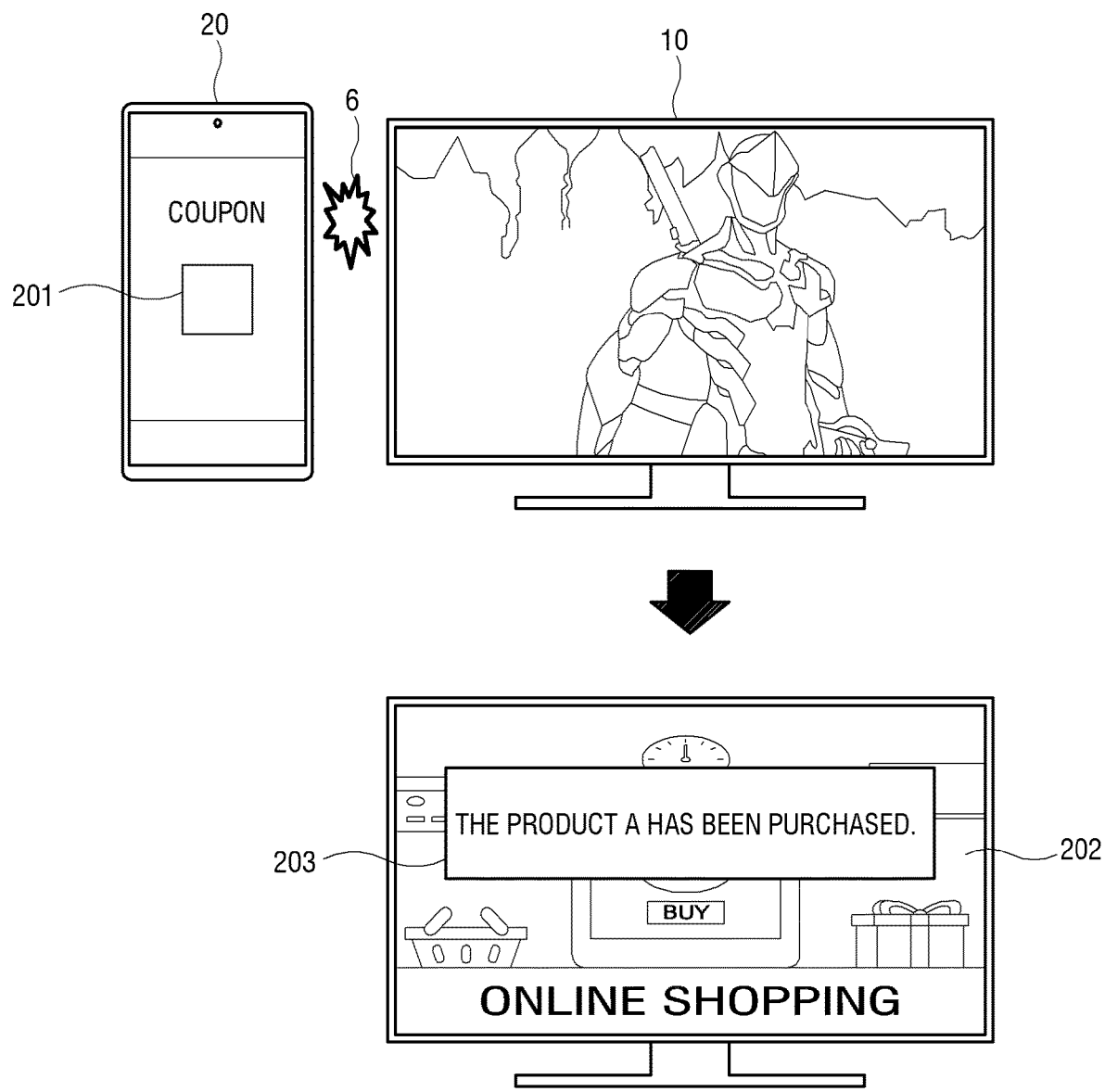
FIG. 20 illustrates a specific example initial or supplementary function of executing a browser corresponding to a proximity event, according to an embodiment of the disclosure.

FIG. 20 illustrates a specific example of executing a browser corresponding to a proximity event, in connection with operation S31 or S34 of FIG. 3, according to an embodiment of the disclosure.

As shown in FIG. 20, the first processor 9 may execute a browser based on the proximity event 6, thereby providing information as desired by a user. For example, when a user makes the proximity event 6 with the external device 20 in which a coupon 201 suable in a specific shopping mall is displayed, the first processor 9 may execute the browser to display a homepage 202 of the shopping mall where the coupon 201 is usable. In more detail, the first processor 9 may display a purchase image for products to which the coupon 201 is applicable.

The first processor 9 may receive information about the coupon 201 when the proximity event 6 occurs, and execute the browser based on the received information so as to display the homepage 202 or the like of the shopping mall where the coupon 201 is usable.

When the subsequent event 7 is detected while the homepage 202 of the shopping mall is displayed based on the proximity event 6, the first processor 9 may perform the function corresponding to the type of the detected subsequent event 7. For example, when the dragging is detected, the first processor 9 may automatically proceed with a purchase procedure for a product A to which the coupon 201 is applicable. The first processor 9 may display a message 203 related to the purchase of the product A.

In this way, the first processor 9 executes the browser for providing the homepage 202 of the shopping mall, in which the coupon 201 is usable, in response to the proximity event 6, and performs an operation of using the coupon 201 in response to the type of the subsequent event 7, thereby improving user convenience in terms of interworking with the external device 20.

Various embodiments of the disclosure are implemented by software including one or more commands stored in a storage medium readable by the electronic device 10 and the like (machine). For example, the first processor 9 of the electronic device 10 calls and executes at least one command among one or more stored commands from the storage medium. This enables the electronic device 10 and the like apparatus to operate and perform at least one function or operation based on the at least one called command. The one or more commands include a code produced by a compiler or a code executable by an interpreter. The machine-readable storage medium is provided in the form of a non-transitory storage medium. Here, the 'non-transitory' merely means that the storage medium is a tangible device and does not include a signal (for example, an electromagnetic wave), and this term does not distinguish between cases of being semi-permanently and temporarily stored in the storage medium. For instance, the 'non-transitory storage medium' may include a buffer in which data is temporarily stored.

For example, methods according to various embodiments of the disclosure may be provided as involved in a computer program product. The computer program product according to the disclosure includes instructions of software to be executed by the processor as mentioned above. The computer program product is traded as a commodity between a seller and a buyer. The computer program product is distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least part of the computer program product (e.g., a downloadable app) is transitorily stored or temporarily produced in a machine-readable storage medium such as a memory of a manufacturer server, an application-store server, or a relay server.

The disclosure has been described in detail through exemplary embodiments, but the disclosure is not limited to these embodiments and may be implemented in various ways without departing from the scope of appended claims.

What is claimed is:

1. An electronic device comprising:
   a display;
   a plurality of sensors provided along edges of the display for detecting a proximity event;
   an interface; and
   at least one processor configured to:
      identify a position of a proximity event caused by an external device, responsive to detecting the proximity event, by identifying a sensor among the plurality of sensors which detects the proximity event,
      perform an initial function to provide a content according to a first display type or a second display type based on the proximity event occurring at a first position or a second position on the electronic device, respectively,
      identify a type of a subsequent event caused by the external device, responsive to detecting the subsequent event through the plurality of sensors while performing the initial function, and
      perform a supplementary function related to the content corresponding to the identified type of the subsequent event among a plurality of supplementary functions,
   wherein the at least one processor is configured to perform the initial function to provide the content and an external content of the external device up and down in parallel according to the first display type based on the proximity event occurring at the first position or to provide the content and the external content left and right in parallel according to the second display type based on the proximity vent occurring at the second position.

2. The electronic device of claim 1, wherein the at least one processor identifies the type of the subsequent event as one of dragging or touching, based on a sensor value corresponding to the subsequent event obtained through the plurality of sensors.

3. The electronic device of claim 2, wherein at least one supplementary function of the plurality of supplementary functions corresponds to at least one of a distance, a direction, or a speed of the dragging.

4. The electronic device of claim 3, wherein at least one supplementary function of the plurality of supplementary functions is a movement of a content image, which is being displayed on a display at a first display position according to performance of the initial function, to a second display position when the distance of the identified dragging exceeds a predetermined threshold.

5. The electronic device of claim 3, wherein at least one supplementary function of the plurality of supplementary functions is a control of the interface to transmit content data to an external output device corresponding to the direction of the identified dragging.

6. The electronic device of claim 3, wherein at least one supplementary function of the plurality of supplementary functions is a control of a content sound, which is being output through one loudspeaker of a plurality of loudspeakers according to performance of the initial function, to be output through another loudspeaker of the plurality of loudspeakers corresponding to the direction of the identified dragging.

7. The electronic device of claim 3, wherein at least one supplementary function of the plurality of supplementary functions is a control of a second content sound to be output through a loudspeaker, in place of first content sound which is being output through the loudspeaker according to performance of the initial function, upon the distance of the identified dragging exceeding a predetermined threshold.

8. The electronic device of claim 2, wherein at least one supplementary function of the plurality of supplementary functions is an adjustment of a display size of a content image, which is being displayed on a display according to performance of the initial function, based on the identified dragging.

9. The electronic device of claim 2, wherein at least one supplementary function of the plurality of supplementary functions is a movement of a display position of a content image, which is being displayed on a display according to performance of the initial function, based on the identified dragging.

10. The electronic device of claim 2, wherein at least one supplementary function of the plurality of supplementary functions is an adjustment of a volume of a content sound, which is being output through a loudspeaker according to performance of the initial function, based on the identified dragging.

11. The electronic device of claim 2, wherein, when the type of the subsequent event is touching, the at least one processor identifies content to be output among a plurality of pieces of content based on a number of occurrences of the touching.

12. The electronic device of claim 2, wherein:
   the at least one processor is configured to receive information about a direction of the touching from the external device, and
   at least one supplementary function of the plurality of supplementary functions corresponds to the direction of the touching.

13. The electronic device of claim 1, wherein the at least one processor is configured to output a plurality of pieces of content respectively corresponding to a plurality of external devices, based on the proximity event being caused by the plurality of external devices.

14. The electronic device of claim 1,
wherein the at least one processor is configured to identify the initial function based on a state of the electronic device.

15. The electronic device of claim 1,
wherein the edges of the display are surrounded in a bezel, and
wherein the at least one processor is configured to detect the proximity event and the subsequent event based on contact or contactless proximity of the external device with respect to the bezel.

16. The electronic device of claim 1,
wherein the first position is an upper side of the electronic device, and
wherein the initial function to provide the content according to the first display type is to perform a PBP (Picture By Picture) function which displays a content displayed before the proximity event occurs at a lower portion of the display and the provided content at an upper portion of the display.

17. The electronic device of claim 16,
wherein the second position is an edge among the edges of the display, and
wherein the initial function to provide the content according to the second display type is performed to display the provided content near the edge which the proximity event occurs in a PIP (Picture In Picture).

18. A method of controlling an electronic device, comprising:
 detecting a proximity event between an external device and one of a plurality of sensors;
 identifying a position of the proximity event caused by identifying a first sensor among the plurality of sensors which detected the proximity event, the identifying of the proximity event having a first sensor value of the first sensor;
 performing an initial function to provide a content according to a first display type or a second display type based on the proximity event occurring at a first position or a second position on the electronic device, respectively;
 identifying a type of a subsequent event caused by the external device, responsive to detecting the subsequent event through one or more second sensors of the plurality of sensors while performing the initial function; and
 performing a supplementary function related to the content corresponding to the identified type of the subsequent event among a plurality of supplementary functions,
wherein the performing the initial function comprises providing the content and an external content of the external device up and down in parallel according to the first display type based on the proximity event occurring at the first position or providing the content and the external content left and right in parallel according to the second display type based on the proximity event occurring at the second position.

19. A non-transitory recording medium storing a computer program comprising computer readable code for controlling an electrode device by operations comprising:
 detecting a proximity event between an external device and one of a plurality of sensors;
 identifying a position of the proximity event caused by identifying a first sensor among the plurality of sensors which detected the proximity event, the identifying of the proximity event having a first sensor value of the first sensor;
 performing an initial function to provide a content according to a first display type or a second display type based on the proximity event occurring at a first position or a second position on the electronic device, respectively;
 identifying a type of a subsequent event caused by the external device, responsive to detecting the subsequent event through one or more second sensors of the plurality of sensors while performing the initial function; and
 performing a supplementary function related to the content corresponding to the identified type of the subsequent event among a plurality of supplementary functions,
wherein the performing the initial function comprises providing the content and an external content of the external device up and down in parallel according to the first display type based on the proximity event occurring at the first position or providing the content and the external content left and right in parallel according to the second display type based on the proximity event occurring at the second position.

* * * * *